(12) United States Patent
Chien

(10) Patent No.: US 9,912,677 B2
(45) Date of Patent: Mar. 6, 2018

(54) EVALUATING A QUESTIONABLE NETWORK COMMUNICATION

(71) Applicant: Daniel Chien, Bellevue, WA (US)

(72) Inventor: Daniel Chien, Bellevue, WA (US)

( * ) Notice: Subject to any disclaimer, the term of this patent is extended or adjusted under 35 U.S.C. 154(b) by 0 days.

(21) Appl. No.: 15/014,906

(22) Filed: Feb. 3, 2016

(65) Prior Publication Data

US 2016/0248795 A1    Aug. 25, 2016

Related U.S. Application Data

(63) Continuation-in-part of application No. 14/691,407, filed on Apr. 20, 2015, which is a continuation-in-part of application No. 13/967,155, filed on Aug. 14, 2013, now Pat. No. 9,015,090, which is a continuation-in-part of application No. 11/712,648,
(Continued)

(51) Int. Cl.
| | |
|---|---|
| *G06F 15/16* | (2006.01) |
| *H04L 29/06* | (2006.01) |
| *H04L 29/12* | (2006.01) |
| *H04L 29/08* | (2006.01) |
| *H04L 12/26* | (2006.01) |
| *G06F 21/62* | (2013.01) |
| *G06Q 40/00* | (2012.01) |
| *G06Q 30/06* | (2012.01) |

(52) U.S. Cl.
CPC ...... *H04L 63/1408* (2013.01); *G06F 21/6218* (2013.01); *G06Q 30/06* (2013.01); *G06Q 40/00* (2013.01); *H04L 43/0876* (2013.01); *H04L 61/2007* (2013.01); *H04L 63/0227* (2013.01); *H04L 63/0245* (2013.01); *H04L 63/101* (2013.01); *H04L 63/1441* (2013.01); *H04L 63/1458* (2013.01); *H04L 63/1483* (2013.01); *H04L 67/18* (2013.01); *G06F 2221/2119* (2013.01); *H04L 61/6063* (2013.01)

(58) Field of Classification Search
CPC ................................. G06F 2221/2119
USPC ........................................ 709/229
See application file for complete search history.

(56) References Cited

U.S. PATENT DOCUMENTS

| | | |
|---|---|---|
| 6,502,135 B1 | 12/2002 | Munger et al. |
| 6,654,796 B1 | 11/2003 | Slater et al. |

(Continued)

FOREIGN PATENT DOCUMENTS

| | | |
|---|---|---|
| WO | 2005/020446 | 3/2005 |

OTHER PUBLICATIONS

Horowitz, Michael, "Examples of Links That Lie," Sep. 2004, 11 pages, http://www.michaelhorowitz.com/inksthatlie.html (accessed Feb. 8, 2008).

(Continued)

*Primary Examiner* — Hamza Algibhah
(74) *Attorney, Agent, or Firm* — Benedict R. Dugan; Lowe Graham Jones PLLC

(57) ABSTRACT

Techniques for evaluating a questionable network communication are disclosed. In some implementations, an evaluation module determines whether a network communication is allowable based on one or more factors, including the listening port, a geographic location, time of day, or the like. In some cases, utilization of a listening port may be limited, such as by restricting the number of network connections that can be opened via the listening port.

20 Claims, 7 Drawing Sheets

Related U.S. Application Data filed on Feb. 28, 2007, now Pat. No. 8,621,604, which is a continuation-in-part of application No. 11/470,581, filed on Sep. 6, 2006, now abandoned.

(60) Provisional application No. 60/714,889, filed on Sep. 6, 2005, provisional application No. 60/783,446, filed on Mar. 17, 2006.

(56) References Cited

U.S. PATENT DOCUMENTS

| | | | |
|---|---|---|---|
| 6,687,226 B1 | 2/2004 | Galyas | |
| 6,888,834 B1 | 5/2005 | Wood et al. | |
| 7,111,163 B1 | 9/2006 | Haney | |
| 7,143,175 B2 | 11/2006 | Adams et al. | |
| 7,346,770 B2 | 3/2008 | Swander et al. | |
| 7,363,656 B2 | 4/2008 | Weber et al. | |
| 7,457,823 B2 | 11/2008 | Shraim et al. | |
| 7,461,404 B2 | 12/2008 | Dudfield et al. | |
| 7,536,723 B1 | 5/2009 | Bhagwat et al. | |
| 7,725,936 B2 | 5/2010 | Banerjee et al. | |
| 7,797,436 B2 | 9/2010 | Banerjee et al. | |
| 7,826,602 B1* | 11/2010 | Hunyady | H04L 29/125 370/389 |
| 8,423,631 B1 | 4/2013 | Mower et al. | |
| 8,495,700 B2* | 7/2013 | Shahbazi | H04L 63/20 380/247 |
| 2002/0133721 A1 | 9/2002 | Adjaoute | |
| 2003/0101357 A1 | 5/2003 | Ronen et al. | |
| 2003/0118038 A1* | 6/2003 | Jalava | H04L 63/0263 370/401 |
| 2003/0084349 A1 | 8/2003 | Friedrichs et al. | |
| 2003/0149668 A1 | 8/2003 | Lee et al. | |
| 2003/0149887 A1 | 8/2003 | Yadav | |
| 2003/0149888 A1 | 8/2003 | Yadav | |
| 2003/0185395 A1 | 10/2003 | Lee et al. | |
| 2003/0188190 A1 | 10/2003 | Aaron et al. | |
| 2003/0217289 A1 | 11/2003 | Ammon et al. | |
| 2004/0003285 A1 | 1/2004 | Whelan et al. | |
| 2004/0068562 A1 | 4/2004 | Tilton et al. | |
| 2004/0088537 A1 | 5/2004 | Swander et al. | |
| 2004/0123141 A1 | 6/2004 | Yadav | |
| 2004/0123157 A1 | 6/2004 | Alagna et al. | |
| 2004/0162992 A1 | 8/2004 | Sami et al. | |
| 2004/0186850 A1 | 9/2004 | Chowdhury et al. | |
| 2004/0187034 A1 | 9/2004 | Tamura et al. | |
| 2005/0047355 A1 | 3/2005 | Wood et al. | |
| 2005/0060412 A1 | 3/2005 | Chebolu et al. | |
| 2005/0076222 A1 | 4/2005 | Olkin et al. | |
| 2005/0172229 A1 | 8/2005 | Reno et al. | |
| 2005/0228899 A1 | 10/2005 | Wendkos et al. | |
| 2006/0021031 A1 | 1/2006 | Leahy et al. | |
| 2006/0031412 A1 | 2/2006 | Adams et al. | |
| 2006/0059092 A1 | 3/2006 | Burshan et al. | |
| 2006/0059136 A1 | 3/2006 | Wooldridge et al. | |
| 2006/0059238 A1 | 3/2006 | Slater et al. | |
| 2006/0059337 A1 | 3/2006 | Poyhonen et al. | |
| 2006/0069697 A1 | 3/2006 | Shraim et al. | |
| 2006/0069782 A1 | 3/2006 | Manning et al. | |
| 2006/0123464 A1 | 6/2006 | Goodman et al. | |
| 2006/0123478 A1 | 6/2006 | Rehfuss et al. | |
| 2006/0168022 A1 | 7/2006 | Levin et al. | |
| 2006/0190993 A1 | 8/2006 | Noble | |
| 2006/0203807 A1 | 9/2006 | Kouretas et al. | |
| 2006/0212931 A1 | 9/2006 | Shull et al. | |
| 2006/0224742 A1* | 10/2006 | Shahbazi | H04L 63/20 709/226 |
| 2006/0230039 A1 | 10/2006 | Shull et al. | |
| 2006/0230272 A1 | 10/2006 | Lawrence et al. | |
| 2006/0253903 A1 | 11/2006 | Krumel | |
| 2007/0006305 A1 | 1/2007 | Florencio et al. | |
| 2007/0083670 A1 | 4/2007 | Kelley et al. | |
| 2007/0268837 A1 | 11/2007 | Melton et al. | |
| 2008/0077995 A1 | 3/2008 | Curnyn | |
| 2008/0147837 A1 | 6/2008 | Klein et al. | |
| 2008/0172382 A1 | 7/2008 | Prettejohn | |
| 2009/0043765 A1 | 2/2009 | Pugh | |
| 2009/0185523 A1* | 7/2009 | Allen | H04L 12/46 370/328 |
| 2009/0271625 A1* | 10/2009 | Kolluru | G06F 21/33 713/170 |
| 2009/0287844 A1 | 11/2009 | Bailey | |
| 2011/0113249 A1 | 5/2011 | Gelbard et al. | |
| 2013/0198065 A1 | 8/2013 | McPherson et al. | |
| 2013/0252604 A1 | 9/2013 | Huber et al. | |
| 2014/0258465 A1* | 9/2014 | Li | H04L 67/02 709/219 |
| 2015/0213131 A1* | 7/2015 | Styler | G06F 17/30864 707/767 |

OTHER PUBLICATIONS

"Netcraft Toolbar Tutorial," Netcraft Ltd, 4 pages, http://news.netcraft.com/archives/2004/12/29/netcraft_toolbar_tutorial.html (accessed Feb. 8, 2008).

U.S. Patent & Trademark Office, Official Communication for U.S. Appl. No. 11/470,581 dated Mar. 20, 2009, 7 pages.

International Search Report and Written Opinion dated Apr. 23, 2008, which issued during the prosecution of International Patent Application No. PCT/US07/64102.

International Search Report and Written Opinion dated Aug. 21, 2014, which issued during the prosecution of International Patent Application No. PCT/US14/31244.

Supplementary European Search Report completed Jul. 11, 2016, in European Patent Application No. 14836161, 7 pages.

\* cited by examiner

EVALUATING A QUESTIONABLE NETWORK COMMUNICATION

CROSS-REFERENCE TO RELATED APPLICATIONS

This application is a continuation-in-part of U.S. application Ser. No. 14/691,407, titled "Evaluating a Questionable Network Communication," filed Apr. 20, 2015, which is a continuation-in-part of U.S. application Ser. No. 13/967,155, titled "Evaluating a Questionable Network Communication," filed Aug. 14, 2013, which is a continuation-in-part of U.S. application Ser. No. 11/712,648 (now U.S. Pat. No. 8,621,604), titled "Evaluating a Questionable Network Communication," filed Feb. 28, 2007, which is a continuation-in-part of U.S. application Ser. No. 11/470,581, titled "Identifying A Network Address Source For Authentication," filed on Sep. 6, 2006, which claims the benefit of U.S. Provisional Application No. 60/714,889, titled "Identifying A Network Address Source For Authentication," filed on Sep. 6, 2005, and U.S. Provisional Application No. 60/783,446, titled "Identifying A Network Address Source For Authentication," filed on Mar. 17, 2006, the benefit of the earlier filing dates of which are hereby claimed under 35 U.S.C. §§ 120 and 119(e), and the entire contents of each are incorporated herein by reference.

TECHNICAL FIELD

The invention disclosed herein is directed to network security and more specifically to identifying and prohibiting a questionable network communication, such as may be received from or initiated by a hacker, an intruder, a phishing source, a virus, an email sender, and/or other false or questionable source.

BACKGROUND

Today, through networks such as the Internet, there are intruders, hackers, unauthorized users, and programmed devices trying to breaking into other computers, servers, firewalls, routers, PDAs, cell phones, game consoles, and other electronic devices that connected to the network. For example, website servers, other devices, and users may send a virus, a worm, adware, spyware, or other files to another electronic device on the network. The files may cause the other device to run some malware (e.g., backdoors, worms, trojans, etc.) that may initiate a network connection to other equipment, such as a web server, to spread a virus, to get another virus, to send confidential information to others, and/or other undesirable actions. It is desirable to detect and prevent these actions from happening.

A file is often delivered by email, such as through a web-based email system. Although email messages typically include an identifier of the sender in a "From" field, it may be difficult to ensure that the sender identifier is valid. For instance, the From field of a phishing email may include an email address with a sender's domain name that appears to indicate a legitimate financial institution's email server. A user may have difficulty determining whether the sender identifier is authentic. In other cases, a network device may request accesses to a client device to deliver a web page, a pop-up advertisement, or other data. A domain name of the requesting network device may indicate a legitimate financial institution's server. Some security software provides a message with address information to a user. The user may choose whether to accept the request. However, many users have difficulty determining whether the sender's address information is authentic.

Another undesirable activity is referred to as phishing. The term phishing is generally associated with attempts to obtain personal and/or confidential information for illegal or unauthorized purposes. Typically, a deceitful person or organization sends one or more emails including a hyperlink to a phishing website that enables a user to enter personal and/or confidential information. Internet phishing websites make people believe that they are entering a real official website of a corporation or other organization. These phishing websites typically accomplish this by making their website look like official websites. General users then give out personal/confidential information without realizing that they have submitted the information to a phishing website, the operators of which may use the information for illegal or unauthorized purposes. The phishing website usually uses a uniform resource locator (URL) with a domain name that is very similar to the real official website. The domain name is also sometimes referred to as a domain name address (DNA). For example, a phishing website may use a DNA like www.paypal.billing.com to make people think this is an official website of Paypal, Inc. The underlying internet protocol (IP) address of the official looking domain name generally routes the user to the phishing web site rather than to an official website of the authentic company. Or the phishing website may use the official company domain name for the hyperlink, but use the phishing website IP address in the hyperlink. When the user clicks on the hyperlink in the email or on a web page, the user is directed to the phishing website rather than to the official website.

Resources on the internet or other network have their own unique IP address. Organizations, including companies, private organizations, government agencies, and the like are assigned their own unique IP address or a range of IP addresses. The same holds true for a phishing website. The phishing website, or other network node, cannot fake its IP address to be somebody else's official IP address due to the Internet IP network routing mechanisms. Even a phishing website has to use its own IP address in order for people to get to the phishing website. It is with respect to these and other issues that the invention is directed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

Figure 1:
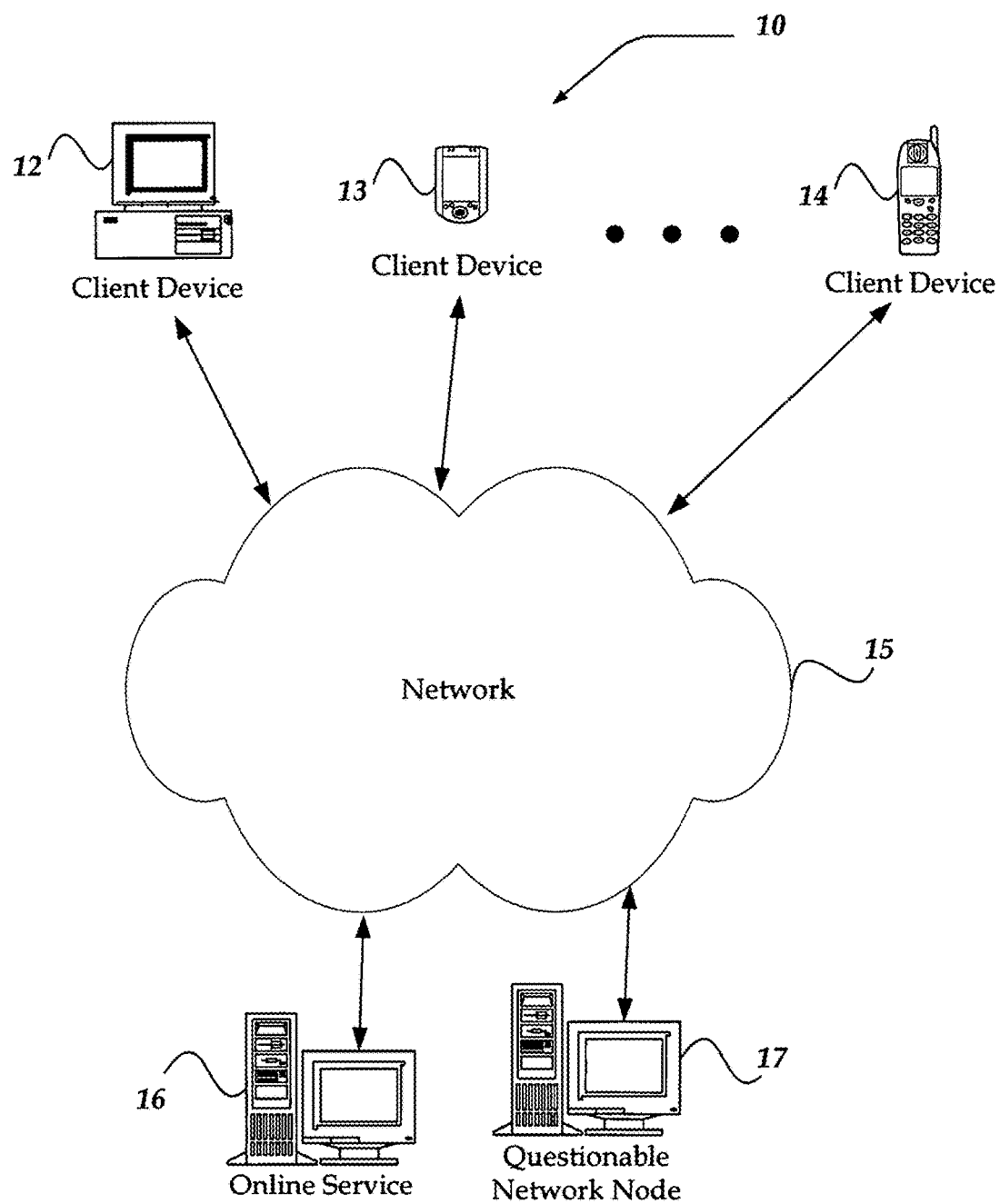
FIG. 1 shows a functional block diagram illustrating one embodiment of an environment for practicing the invention.

Embodiments of the present invention now will be described more fully hereinafter with reference to the accompanying drawings, which form a part hereof, and which show, by way of illustration, specific example embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" or "in an example embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In this specification, the term "client" refers to a computing module's general role as an end processor of data or services, and the term "server" refers to a computing module's role as a provider of data or services to one or more clients. In general, it is possible that a computing module can act as a client, requesting data or services in one transaction and act as a server, providing data or services in another transaction, thus changing its role from client to server or vice versa.

The term "web" generally refers to a collection of devices, data, and/or other resources that are accessible over a network according to one or more protocols, formats, syntax, and/or other conventions that are intended for use with computing devices, such as personal computers, laptop computers, workstations, servers, mini computers, mainframes, cellular phones, personal digital assistants (PDAs), and the like. Web protocols include, but are not limited to, the hypertext transfer protocol (HTTP). Such conventions include, but are not limited to, hypertext markup language (HTML) and extensible markup language (XML). The terms "web page" and "web data" generally refer to a document, file, application, service, and/or other data that conforms to web conventions and is generally accessible with a computing device running an application such as a general purpose browser. Example general purpose browsers include Internet Explorer™ from Microsoft Corporation, Netscape™ from Netscape Communications Corp., and Firefox™ from the Mozilla Foundation. Web pages are generally indexed by search engines that are able to access web pages. An example search engine is Google™ by Google, Inc.

The term "URL" generally refers to a uniform resource locator, but may also include a uniform resource identifier and/or other address information. A URL generally identifies a protocol, such as hypertext transfer protocol (e.g., "http://"), a host name (e.g., "news.google.com) or a domain name (e.g., "google.com"), a path (e.g., "/intl/en/options"), and a specific file (e.g., "pack_installer.html") or a query string (e.g., "?hl=en"). The term "URI" generally refers to a string of characters used to identify a name or a web resource. Combined with URL, this can represent web resource over a network.

Briefly, embodiments of the invention evaluate a network address against a list of known trusted addresses to validate a communication. Multiple tiers of security are provided. In one embodiment, a top tier is an IP address; a second tier is a port number, and a third tier is a property of a communication payload. Other tiers may be associated with other aspects of the communication. One or more ties can be selectively implemented. Each tier may be associated with a level of user involvement needed to approve a communication.

Illustrative Operating Environment

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, a system 10 includes client devices 12-14, a network 15, an online service 16, and a questionable network node 17 that is not directly associated with the online service. Network 15 is in communication with and enables communication between each of client devices 12-14, online service 16, and questionable network node 17. Online service 16 may comprise one or more servers for a legitimate website, an email service, a file storage service, a domain name assignment service, a network address identification service, and the like. Questionable network node 17 may comprise a dishonest user's client device, a source of computer viruses, one or more servers for a website posing as another website, a valid network node that has been compromised by a hacker, or another network node used for illegitimate or misleading purposes. Each network node has a network address, such as an IP address that is unique to each network node. The network address generally also includes a port number to identify a specific communication session, a particular resource within a network node, or other refinement to the network address to enable proper communication between nodes. The true network address is needed for communication to or from a network node. Address masking, domain name translation, and other schemes may disguise a network address at various points along a communication path. However, the true network address is derived at some point, or the communication will not occur between the intended nodes.

Client devices 12-14 may include virtually any computing device capable of receiving and sending a message over a network, such as network 15, to and from another computing device, such as online service 16, each other, and the like. The set of such devices may include devices that are usually considered more general purpose devices and typically connect using a wired communications medium such as personal computers, multiprocessor systems, microprocessor-based or programmable consumer electronics, network PCs, and the like. The set of such devices may also include mobile terminals that are usually considered more specialized devices and typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client devices 12-14 may be any device that is capable of connecting using a wired or wireless communication medium such as a personal digital assistant (PDA), POCKET PC, wearable computer, and any other device that is equipped to communicate over a wired and/or wireless communication medium.

Each client device within client devices 12-14 includes a user interface that enables a user to control settings, and to instruct the client device to perform operations. Each client device may also include a browser application that is configured to receive and to send web pages, web-based messages, and the like. The browser application may be configured to receive and display graphics, text, multimedia, and the like, employing virtually any web based language, including, but not limited to Standard Generalized Markup Language (SGML), HyperText Markup Language (HTML), Extensible Markup Language (XML), a wireless application protocol (WAP), a Handheld Device Markup Language (HDML), such as Wireless Markup Language (WML), WMLScript, JavaScript, and the like. Client devices 12-14 may be further configured with a communication interface that enables the client device to send and receive messages from another computing device employing the same or a different communication mode, including, but not limited to email, instant messaging (IM), short message service (SMS) messaging, multi-media message service (MMS) messaging, internet relay chat (IRC), Mardam-Bey's internet relay chat (mIRC), Jabber, and the like.

Network 15 is configured to couple one computing device to another computing device to enable them to communicate. Network 15 is enabled to employ any form of medium for communicating information from one electronic device to another. Also, network 15 may include a wired interface, such as an Internet interface, and/or a wireless interface, such as a cellular network interface, in addition to an interface to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize cellular telephone signals over air, analog telephone lines, full or fractional dedicated digital lines including T1, T2, T3, and T4, Digital Signal level 3 (DS3), Optical Carrier 3 (OC3), OC12, OC48, Asynchronous Transfer Mode (ATM), Integrated Services Digital Networks (ISDNs), Digital Subscriber Lines (DSLs), wireless links including satellite links, or other communications links that are equivalent and/or known to those skilled in the art. Furthermore, remote computers and other related electronic devices could be remotely connected to either LANs or WANs via a modem and temporary telephone link. In essence, network 15 includes any communication method by which information may travel between client devices 12-14, online service 16, and/or questionable network node 17. Network 15 is constructed for use with various communication protocols including transmission control protocol/internet protocol (TCP/IP), user datagram protocol (UDP), WAP, code division multiple access (CDMA), global system for mobile communications (GSM), and the like.

The media used to transmit information in communication links as described above generally includes any media that can be accessed by a computing device. Computer-readable media may include computer storage media, wired and wireless communication media, or any combination thereof. Additionally, computer-readable media typically stores and/ or carries computer-readable instructions, data structures, program modules, or other data that can be provided to a processor. Computer-readable media may include transmission media for transmitting a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wireless media such as acoustic, RF, infrared, and other wireless media, and wired media such as twisted pair, coaxial cable, fiber optics, wave guides, and other wired media.

One embodiment of an electronic device is described in more detail below in conjunction with FIG. 2. For discussion purposes, a general purpose client computing device is described as an example. However, a server device, a special purpose device (e.g., cell phone), and/or other electronic device may be used in embodiments of the invention. In this example, a client device 20 may include any computing device capable of connecting to network 15 to enable a user to communicate with other network resources, such as client devices, portal server 16, and/or questionable network node 17. Client device 20 may include many more components than those shown. The components shown, however, are sufficient to disclose an illustrative embodiment for practicing the invention. Many of the components of client device 20 may also be duplicated in a server of online service 16, a server of questionable network node 17, and/or other electronic devices.

As shown in the figure, client device 20 includes a processing unit 22 in communication with a mass memory 24 via a bus 23. Mass memory 24 generally includes a RAM 26, a ROM 28, and other storage means. Mass memory 24 illustrates a type of computer-readable media, namely computer storage media. Computer storage media may include volatile and nonvolatile, removable and non-removable media implemented in any method or technology for storage of information such as computer readable instructions, data structures, program modules or other data. Other examples of computer storage media include EEPROM, flash memory or other semiconductor memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Mass memory 24 stores a basic input/output system ("BIOS") 30 for controlling low-level operation of client device 20. The mass memory also stores an operating system 31 for controlling the operation of client device 20. It will be appreciated that this component may include a general purpose operating system such as a version of Windows™, UNIX, LINUX™, or the like. The operating system may also include, or interface with a virtual machine module that enables control of hardware components and/or operating system operations via application programs.

Mass memory 24 further includes one or more data storage units 32, which can be utilized by client device 20 to store, among other things, programs 34 and/or other data. Programs 34 may include computer executable instructions which can be executed by client device 20 to implement an HTTP handler application for transmitting, receiving and otherwise processing HTTP communications. Similarly, programs 34 can include an HTTPS handler application for handling secure connections, such as initiating communication with an external application in a secure fashion. Other examples of application programs include schedulers, calendars, web services, transcoders, database programs, word processing programs, spreadsheet programs, and so forth. Accordingly, programs 34 can process web pages, audio, video, and enable telecommunication with another user of another electronic device.

In addition, mass memory 24 stores one or more programs for messaging and/or other applications. A messaging client module 36 may include computer executable instructions, which may be run under control of operating system 31 to enable email, instant messaging, SMS, and/or other messaging services. Similarly, a server device configured much like client device 20 (and/or client device 20 itself) may include a messaging server module 37, which provides routing, access control, and/or other server-side messaging services. Client device 20 may further include an evaluation module 38, which generally evaluates communications for valid senders, requests, and/or other data. In one embodiment, evaluation module 38 may comprise an anti-phishing module, which interacts with a phishing website to enable client device 20 to identify the phishing website's network address and may determine whether the network address is associated with an illegitimate website. Another example embodiment comprises an authorization module, which may check email messages, file downloads, redirections, and/or other communications. Evaluation module 38 may be implemented separate from other applications, may be implemented as a plug-in to another application (such as a browser), may be implemented directly within another applications (such as an email application), may be implemented as a server application, and/or other forms.

Figure 2:
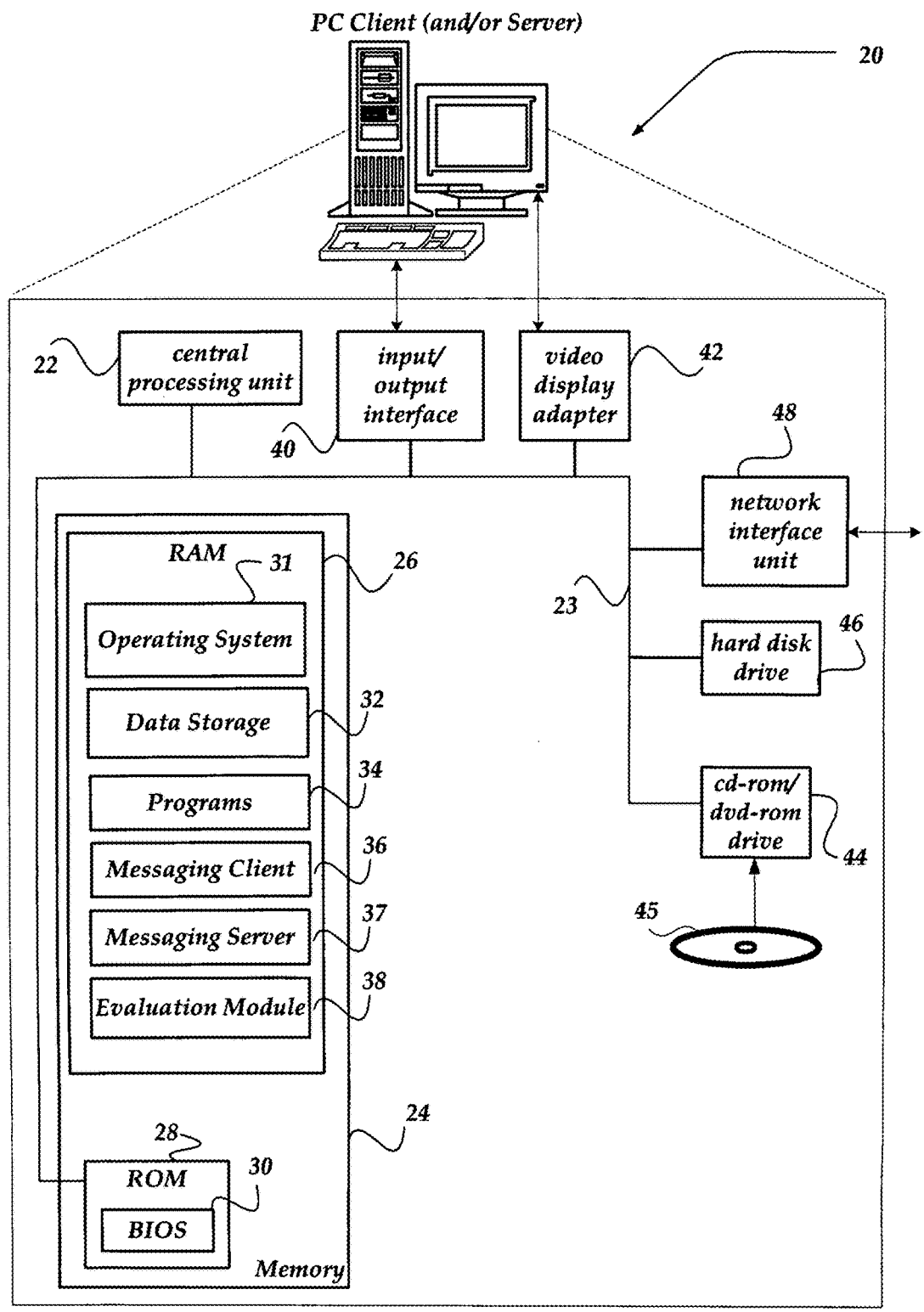
FIG. 2 shows one embodiment of a client and/or server device that may be included in a system implementing the invention.

Client device 20 also includes an input/output interface 40 for communicating with input/output devices such as a keyboard, mouse, wheel, joy stick, rocker switches, keypad, printer, scanner, and/or other input devices not specifically shown in FIG. 2. A user of client device 20 can use input/output devices to interact with a user interface that may be separate or integrated with operating system 31 and/or programs 34-38. Interaction with the user interface includes visual interaction via a display, and a video display adapter 42.

For some client devices such as a personal computer, client device 20 may include a removable media drive 44 and/or a permanent media drive 46 for computer-readable storage media. Removable media drive 44 can comprise one or more of an optical disc drive, a floppy disk drive, and/or a tape drive. Permanent or removable storage media may include volatile, nonvolatile, removable, and non-removable media implemented in any method or technology for storage of information, such as computer readable instructions, data structures, program modules, or other data. Examples of computer storage media include a CD-ROM 45, digital versatile disks (DVD) or other optical storage, magnetic cassettes, magnetic tape, magnetic disk storage or other magnetic storage devices, RAM, ROM, EEPROM, flash memory or other memory technology, or any other medium which can be used to store the desired information and which can be accessed by a computing device.

Via a network communication interface unit 48, client device 20 can communicate with a wide area network such as the Internet, a local area network, a wired telephone network, a cellular telephone network, or some other communications network, such as network 15 in FIG. 1. Network communication interface unit 48 is sometimes known as a transceiver, transceiving device, network interface card (NIC), and the like.

Example Implementation

To make it easier for users to remember network addresses, a domain name like www.cnn.com is associated with a numerical IP address. The domain name is also sometimes referred to as the domain name address (DNA). Additional information may be added to the domain name, such as a path, to specify a uniform resource identifier (URI), which is typically associated with a numerical uniform resource locator (URL) that specifies the network location of a resource such as a markup document, image, or other data. A central database is typically used to maintain the association between IP addresses and corresponding domain names. Generally, a domain name server (DNS), an internet service provider (ISP), or other database maintains the associations. In an example embodiment involving the internet, an organization such as the Internet Corporation for Assigned Names and Numbers (ICANN), the Internet Assigned Numbers Authority (IANA), or other assigning organization maintains associations between domain names and IP addresses. An owner name, country, and/or other information is also associated with each IP address.

Multiple embodiments are possible to identify a questionable network node. For example, embodiments of the invention can identify a phishing website. Although not limited to the following, two examples are described below.

1. Phishing website IP address—If a phishing website provides its IP address directly to a client, the IP address is checked with a local database or an assigning authority. By querying the website's IP address against a local assignment database or against the database of ICANN, IANA, or other assigning organization, the website's owner is identified.

2. Phishing website domain name—In general, the IP address is usually not provided directly. Instead, a domain name like www.cnn.com is usually provided. By querying the domain name against a DNS, the corresponding IP address can be found. Upon querying this IP address against a local assignment database or the database of ICANN, IANA, or other assigning organization, the website's owner is identified. Those skilled in the art will recognize that the two steps may be done by a single service.

Multiple embodiments are also possible for different applications. Although not limited to the following, three examples are described below.

A) Embedded function—An application program includes an embedded function that evaluates a link in a document. For instance, an email program, IM program, or a word processing program includes a menu option or button to activate an embedded function for evaluating a link in a message or a document. The user can activate the function, or the function may run automatically upon detecting a link in the document. The function access the address associated with the link to get back the IP address and port number. The function queries a local or remote assignment database to get the owner's name and country. The function may display the owner's name and country, such as when the user positions the mouse pointer over the link, and/or in a predefined screen location. The function may additionally, or alternatively, compare the owner's name and address to a database of know owners associated with domain names. A warning is displayed upon mouse-over or in a predefined screen location.

B) Browser display—Similarly, a browser is modified directly, or with a plug-in, to provide one or more new fields, showing an IP address owner's name and country associated with a current URL or webpage being rendered by the browser. In addition, the browser may issue a visual, audio, or other warning, if the owner of the current domain name does not match a known owner's name and country for the domain.

C) An online service—A user can submit a URL or domain name through a webpage field to an online query service and receive the domain name owner's real name and country. The online service takes the risk of accessing the URL to obtain the IP address. The online service may return the IP address to the client of the submitting user for further evaluation. Alternatively, the online service may determine the owner's name and country and compare this information with a database of known owner's and countries corresponding to the submitted domain name. The online service then sends the owner's name and country to the client of the submitting user. The online service or the client webpage issues a warning to the user if the domain name is not associated with the domain name owner's real name and country.

Further detail is now provided for determining an owner and country. IP addresses (e.g., for IP V4 or V6) are generally assigned in a delegated manner. Users may be assigned IP addresses by ISPs. ISPs generally obtain allocations of IP addresses from a local Internet registry (LIR), from a national Internet registry (NIR), or from one or more appropriate Regional Internet Registries (RIRs):

AfriNIC (African Network Information Centre)—Africa Region (http://www.afrinic.net/)

APNIC (Asia Pacific Network Information Centre)—Asia/Pacific Region (http://www.apnic.net/)

ARIN (American Registry for Internet Numbers)—North America Region (http://www.arin.net/)

LACNIC (Regional Latin-American and Caribbean IP Address Registry)—Latin America and some Caribbean Islands (http://lacnic.net/en/index.html)

RIPE NCC (Reseaux IP Europeens)—Europe, the Middle East, and Central Asia (http://www.ripe.net/)

Registry organizations typically operate servers that maintain the associations between domain names and IP addresses. Such servers are sometimes referred to as "whois" servers. By querying one or more of the above website servers, the IP address owner's name and country can be found. The querying can be performed by having the browser send an HTTP request to the appropriate server(s), and obtain a response. Alternatively, one local database, such as a client browser database, or other local or cached database can include one or all databases of "whois" servers to make the query easier and faster. Once the owner and/or country is identified, a user or an automated process can determine whether the website is authentic or a phishing website.

Similar to DNS databases, public whois databases may not be entirely reliable. Owners of phishing websites may register with the whois registry to take advantage of the registry for themselves. To counteract this potential issue, a local database may be used to supplement or replace the information from public "whois" servers to enhance the resolution of the name of the owner. For example, a legitimate company name may not be obviously recognized from a "whois" server. The supplemental database can provide more precise information, such as a unique code, about this company along with its IP address. In another example, legitimate financial institutions, companies, or government organization can be separately verified and authenticated before being added to this supplemental database.

In some situations, the IP address identifies a proxy server, a network address translation (NAT) server, a firewall, and/or other network intermediaries. To find out the true IP address of a potential phishing website (or other illegitimate resource), the network intermediary device, its owner, or other authorized entity checks one or more intermediary mapping tables, log files, and/or other mapping data. From this intermediary mapping data, the authorized entity maps a timestamp and/or TCP port number to internal IP address information. The internal IP address can be checked against internally assigned names to determine a name, a location, and/or other internal information. Obtaining such internal information generally involves cooperation from an internet service provider, from an owner of the network intermediary, and/or from other sources. This additional internal information can be provided to a client or to a trusted evaluation service to determine whether a website is valid or a phishing website.

In one embodiment, a log file or mapping data may have the following information for reverse lookup:

1. Timestamp
2. Internal/Local data, such as an internal IP address to a potential phishing website, to a potential hacker's account, to an internal file, and/or to another internal resource.
3. External network data, such as Internet source and/or destination IP address, source and/or TCP/UDP port number, and/or other data that identifies mapping information to a potential phishing website, to a potential hacker's account, and/or to another source. For instance, an intermediary gateway log file may include a source IP address and a source TCP port number from which a spammer sent an email with a link to a phishing website. The log file may also include a destination IP address and destination port number to which the email message was sent. Similarly, a log file may include an intermediary gateway log file may include a source IP address and a source TCP port number from which a hacker attempted to access a destination IP address and destination port number. Often, port number 80 or 443 is used. If these port numbers are not returned, the link may be associated with a phishing website. Conversely, if a valid website intentionally uses a port number other than 80 or 443, and the returned port number is 80 or 443, the corresponding link may be associated with a phishing website.

Figure 3:
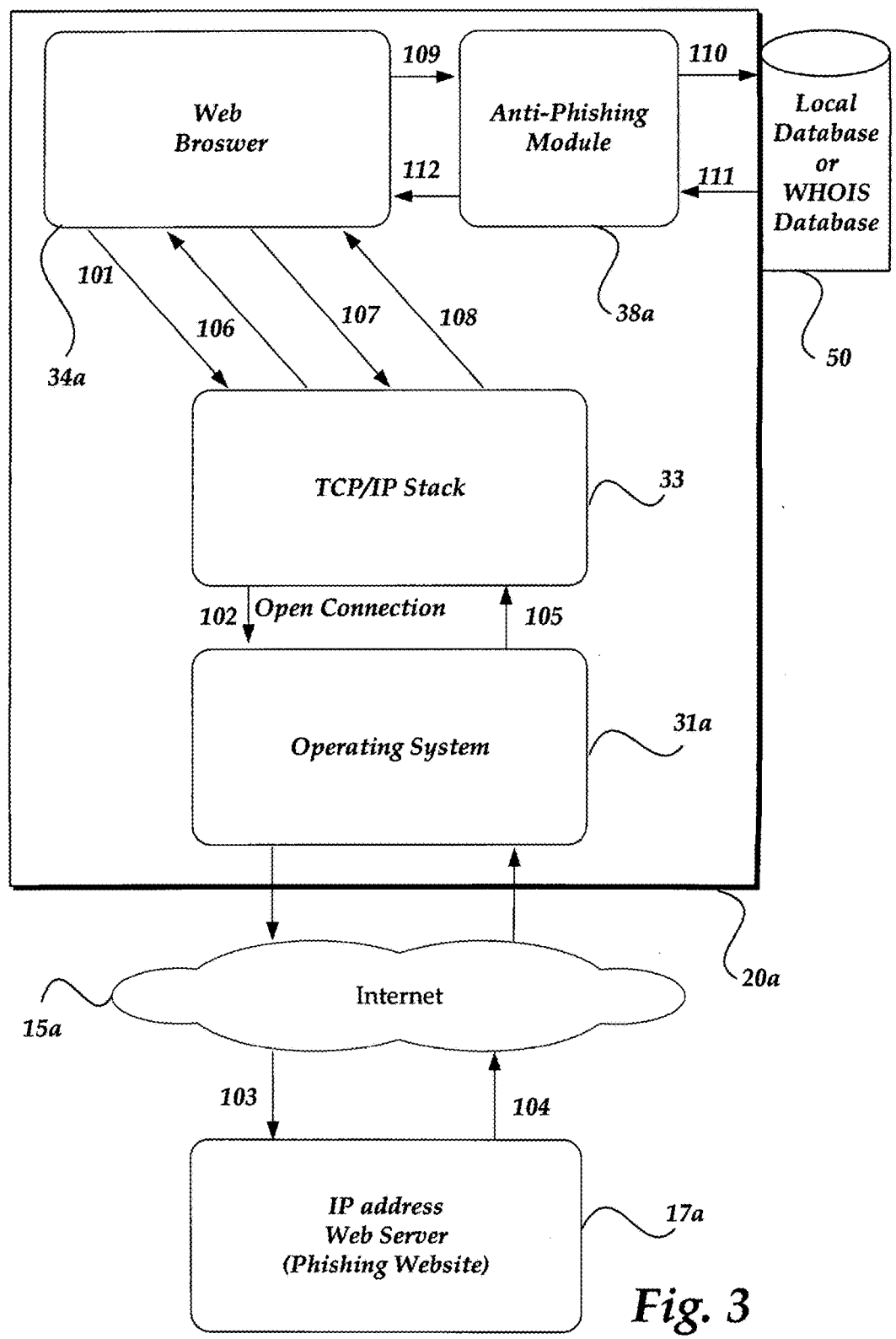
FIG. 3 illustrates an architecture and communication sequence for one embodiment of the present invention.

FIG. 3 illustrates an architecture, communication sequence, and method for one embodiment of the present invention. Not all of the illustrated modules may be required to practice the invention, or additional modules may be included for other embodiments. In various embodiments, some modules may be combined, while other modules may be divided into multiple modules.

In this example embodiment, the architecture includes a client 20*a* that communicates through a public internet 15*a* to an IP address web server 17*a* that corresponds to a phishing website. Client 20*a* includes an operating system 31 in communication with internet 15*a* and in communication with a TCP/IP stack 33. TCP/IP stack 33 is in communication with a web browser 34*a*, which is in communication with an anti-phishing module 38*a*. The anti-phishing module is in communication with a network address database 50, which may be a local database in client 20*a* or may be a remote network database, such as a network address registry database available through a local network or through internet 15*a*. Network address database 50 generally stores an association between IP addresses and domain names and their owners.

A user of client 20*a* may receive an email that includes a link, or may view a link in a web page rendered by browser 34*a*. The link may appear valid, but the user may not be certain of the link's validity. The user may position a mouse pointer over the link or select the link. In one embodiment, the user may position the mouse pointer over the link and press a right button on the mouse to select a menu option to invoke anti-phishing module 38*a* for checking the link. In another embodiment, the user may simply select the link. The following discussion describes an embodiment in which the user selects the link through web browser 34*a*. However, those skilled in the art will recognize that a messaging service, such as email, and/or other applications may be used. Similarly, those skilled in the art will recognize that a passive check of the link may be performed through a menu option available when a right mouse button is pressed.

In this example embodiment, browser 34*a* detects user selection of the link and sends a request for the corresponding web page at a communication step 101. The request is first sent to TCP/IP stack 33 to resolve the link URL into an IP address. Resolving the URL may require accessing a network address registry database, an internet service provider (ISP), or other source that associates the URL with its corresponding IP address. However, the IP address from such a source may be masked or otherwise misleading. Also, the port number is not necessarily obtained by resolving the URL. To ensure that the true IP address and port number is obtained, TCP/IP stack 33 sends the request through to operating system 31*a* at a communication step 102, and the operating system makes a TCP connection through the internet to the questionable network node 17*a*, at a communication step 103.

Questionable network node 17*a* (e.g., its corresponding server) returns the requested web page at a communication step 104. Also returned is the accurate IP address and port number of the phishing website. Client operating system 31*a* receives the web page, address, and port number and passes this information to TCP/IP stack 33 at a communication step 105. The TCP/IP stack passes the web page to browser 34*a* at a communication step 106. At a communication step 107, the browser requests the IP address and port number from the TCP/IP stack. For example, the browser may invoke a GetIPAddressByName object or a GetHostByName object. The TCP/IP stack returns the IP address and port number to the browser at a communication step 108.

Browser 34*a* then passes the IP address, port number, and URL (or domain name or host name) to an anti-phishing module 38*a*, at a communication step 109. The anti-phishing module uses this information to request the owner name, country, and/or other identification data (if available) from database 50, at a communication step 110. Database 50 returns the requested information to anti-phishing module 38*a*, at a communication step 111. Anti-phishing module 38*a* may pass the information directly to browser 34*a* for display. However, in one embodiment, anti-phishing module 38*a* determines whether the owner name and country match the known information for the domain name of the URL. If a match is not found, anti-phishing module then sends an instruction at a communication step 112 for browser 34*a* to display a warning.

Figure 4:
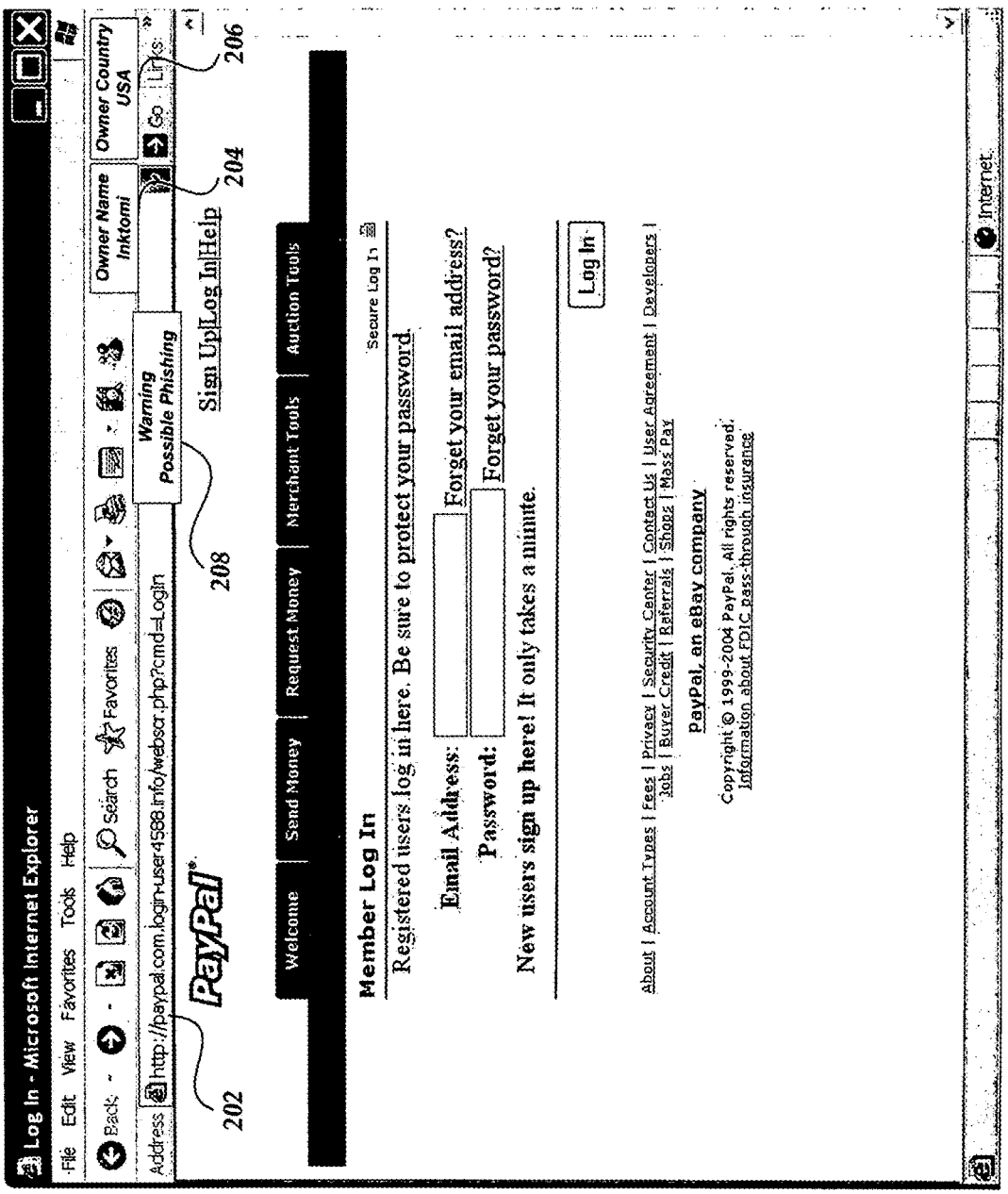
FIG. 4 illustrates a screen shot for one embodiment of the present invention.

FIG. 4 illustrates a screen shot of a web page 200 for one embodiment of the present invention. In this example, a phishing website poses as an official website of a company such as Paypal, Inc. A uniform resource locator (URL) 202 is shown in the browser address field. The URL was accessed via a hyperlink from an unsolicited email. The IP address associated with the domain name of the URL is 68.142.234.59. The associated IP address owner's name 204 and country 206 are displayed near the domain name address shown in a browser address field. A user, an anti-phishing plug-in, and/or other decision module may compare the owner's name and country with the domain name to determine authenticity. Some comparisons are relatively easy. For example, if an IP owner's name is an unknown organization or an individual's name, and the domain name indicates a well-known company, there may be a weighted decision against the IP owner being the authentic owner of the domain name. Similarly, if the IP owner's country is one that has a history of counterfeit activities or is far from the home country of the known company, there may be further weighting against the IP owner being an authentic owner of the domain name. The IP address may also be simply compared with a known IP address, or range of addresses of the known company. The weighted information may lead to a decision that the IP address is not an authentic website, and is a phishing website.

As shown in FIG. 4, web page 200 appears to be that of Paypal, Inc. The IP owner 202 is displayed as Inktomi, Inc., which is a valid company. However, the IP address associated with the domain name www.paypay.com is 216.113.188.67. A large organization may have many IP addresses, so it may be unclear whether an IP address is owned by a valid organization. The country 206 associated with the IP address of the URL is the United States, which also appears valid. Thus, additional information may be used. In this example, it is known that Paypal, Inc. is owned by the company Ebay, Inc., which is not associated with Inktomi, Inc. Thus, the shown website is likely to be a phishing web site. An optional warning 208 is displayed in another browser field, in a pop-up window, and/or in another way.

Further Example Implementation

In an IP network, such as the Internet, a connection or session between two nodes is generally made using IP addresses and TCP/UDP port numbers. Either node is aware of its own and the other node's IP address and port number. The port is generally an endpoint to a network node. The port number typically represents a specific communication session, a specific function, a specific resource, or other identity within this network node. Port numbers are generally divided into three ranges: Well Known Ports, Registered Ports, and Dynamic and/or Private Ports. The Well known Ports are generally assigned by an assignment service, such as IANA. Registered Ports may be optionally registered for desired purposes. Dynamic or Private Ports are generally used by a network node for frequently changing communications and/or for private purposes.

For an outbound connection request to another node, a client uses the other node's IP address and port number. For an inbound connection, such as to a client, the requester will identify its IP address and port number. If an intermediary node is used, such as an internet service provider server, the intermediary node will generally know each node's IP address and port number. For example, a server will generally know the IP address and local port number of both a requesting node and a client node, so that the intermediary server can relay communications between the requesting node and the client node.

Similarly, for downloading a file that is initiated by a server or a client, the IP addresses and port numbers are known. For instance, if the download is from a website or other network service, the IP address and port number of a network node that provides the file can be determined from a public or local assignment database, as discussed above. In some circumstances, the IP address and port number may be those of a valid, trustworthy network node. However, a hacker may access the trustworthy node and attempt to distribute a virus or other undesirable file. In this case, an embodiment of the invention evaluates the payload of the communication. In one embodiment, an evaluation module evaluates the payload of a packet to determine and check payload data against a category identifier that indicates allowable data. In another embodiment, the evaluation module evaluates an overall file extension, file author, creation date, and/or other properties of a file to be transferred, to determine whether the file should be blocked and/or a warning issued. For example, it may be acceptable to download a news document from a trusted network node, but not download executable code. One or more category codes can be associated with the IP address and port number of each trustworthy node to indicate those types of payload data, download files, or other data that are allowed.

The IP address, port number, and category code are stored in a file, database, and/or other data source that identifies network nodes and files that are valid and/or otherwise trusted. Such a data source is sometimes referred to herein as a white list. A white list is generally distinct from a black list that specifically identifies addresses, nodes, data sources, or other information that is to be blocked or otherwise not trusted. For example, a white list used for certain embodiments of the invention does not include IP addresses for any unauthenticated network nodes or any anonymous proxy servers.

The white list may be a subset of an IANA WHOIS database. It may identify network nodes of only legitimate financial institutions, reputable websites, reputable download websites, reputable antivirus company websites, and/or other service providers. Such service providers may include an ISP. Thus, the white list may be modified during installation or otherwise, to include IP addresses and other information associated with one or more internet service providers. Service providers may need to access client equipment, other internet nodes that a client node may need to access, or some other network node that has permission to access a certain device for a specific function. In addition, a white list may include an address owner's name, domain name, category code, and other information. A white list may be stored at a client, at a server that provides a file, at an intermediary node in the communication, or at a neutral node that is not directly part of the communication between two end nodes. Multiple white lists may be used at a single, or multiple nodes, to accommodate masked network addresses, proxy servers, and the like. For example, multiple white lists may be distributed to various routers or other nodes to perform intermediary checks as a message, web page, or other communication moves along a communication path.

Embodiments of the invention can be implemented to provide multiple tiers of security. A top tier is the IP address. A second tier is the port number. A third tier is the category. Other tiers may be associated with other aspects of the communication. Depending on application requirements, an embodiment may apply various levels of evaluation. One embodiment may only perform a first tier evaluation by checking a white list for a trusted IP address. For higher security, an embodiment may check all three tiers. An administrator may set a level of evaluation in an evaluation module.

Other information in the white list may include a security rating, which is used to indicate whether user interaction is need. For example, for a highest security rating, an evaluation module will automatically perform its evaluation and make all decisions. For another security rating, a user interaction may be needed to allow a communication, a file download, or other action associated with a questionable network node. For a lowest rating, the evaluation module may automatically block communication, file download, or other access. In addition, or alternatively, the security rating may be confirmed or separately determined while checking a communication. For example, if the IP address, port number, and category code matches those in the white list, the evaluation module may indicate a high security rating. If the IP address and port number match, but the category code does not match, the evaluation module may determine an intermediate security rating, and request a user instruction on how to proceed. If the IP address and port number do not match those in the white list, the evaluation module may determine a lowest security rating. The evaluation module and/or other applications can take different actions, depending on the security rating.

Multiple scenarios exist in which an evaluation module may identify a high risk network node. Although not limited to the following, some examples include:

1. For an outbound connection request, like visiting a website, an FTP (File Transfer Protocol) site, or other network node, the destination node's IP address and port number are checked. If the destination node's IP address and port number are not in the white list, or otherwise considered a high risk, the evaluation module can prevent the connection, give a warning, require a user approval, require additional authentication of the destination node, or perform another predefined action. If the user were to approve the connection, the destination node's IP address, port number, and/or other information would be added to the white list.

2. For an inbound connection request, the requesting node's IP address and local device port number are checked against the white list. This can stop an intruder, a hacker or other unauthorized user from gaining access to the receiving device. The receiving device (or an intermediary node) can refuse the connection, give a warning, require a user approval, require additional authentication of the requesting node, or perform another predefined action. If the user were to approve the connection, the requesters node's IP address, port number, and/or other information would be added to the white list.

3. For file transfer, the source node can be checked before a file is downloaded. Conversely, a destination node can be checked before a file is sent to a questionable node. As discussed above, the IP address, port number, and file type can be checked against the white list. Similar to the connection scenarios, the evaluation module can prevent the file transfer, require a user approval, require additional authentication of the requesting node, or perform another predefined action. If the user were to approve the file transfer, the questionable node's IP address, port number, and/or other information would be added to the white list. The file extension would also be stored as a category along with the corresponding IP address, port number, and/or other information.

White lists and other data structures used to specify security policies, rules, or properties may be organized in various ways. In some cases, the white list can be represented as a key-value data structure, in which keys are associated with values. The keys are typically IP addresses or address ranges, but could also or instead by network interface numbers, user identifiers, program names, process identifiers, geographic locations, or the like. The values are typically policies, rules, or properties that are used to express a limitation or permission to perform a network communication.

Figure 5:
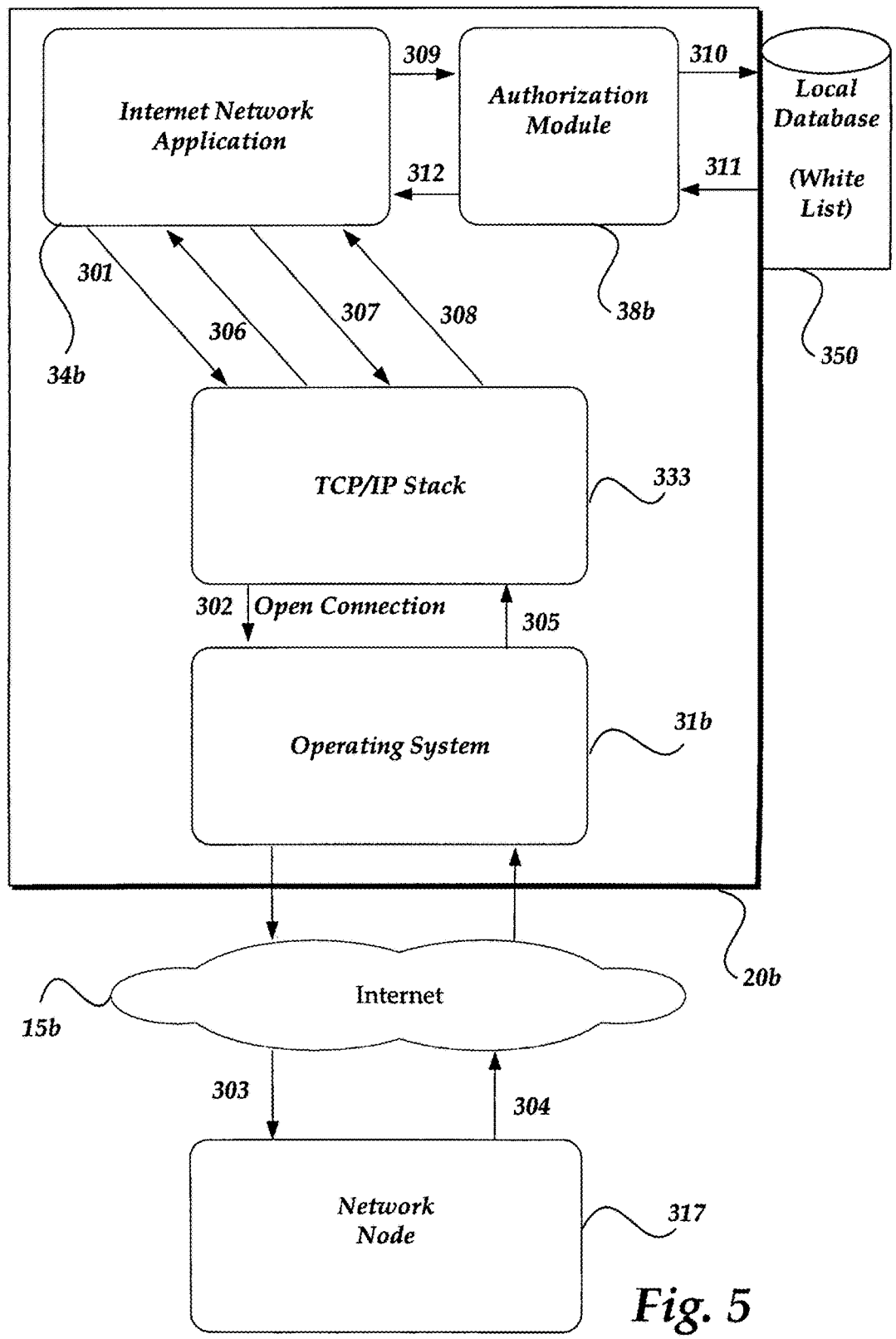
FIG. 5 illustrates an architecture and communication sequence for further embodiment of the present invention.

FIG. 5 illustrates an architecture, communication sequence, and method for a further embodiment of the present invention. Not all of the illustrated modules may be required to practice the invention, or additional modules may be included for other embodiments. In various embodiments, some modules may be combined, while other modules may be divided into multiple modules. Example scenarios are discussed relative to the following architecture.

In this example embodiment, the architecture includes a client 20*b* that communicates through a public internet 15*b* to an IP address of a Network Node 317 that corresponds to a website, an FTP site, or other internet service. Client 20*b* includes an operating system 31*b* in communication with internet 15*b* and in communication with a TCP/IP stack 333. TCP/IP stack 333 is in communication with an Internet Network Application 34*b*, which is in communication with an Authorization module 38*b*. The Internet Network Application 34*b* may be an email application or other application that can be used to prevent communications involving a hacker, virus, or other undesired entity. The Authorization module is in communication with a local database 350, which may be included in client 20*b* or in communication with client 20*b*. Local database 350 generally comprises a white list storing an association between IP addresses, TCP/IP port number, category, security rating, domain names, their owners and/or other data.

Example Scenario 1: Outbound Connection

In this example embodiment, a user of client 20*b* may initiate an Internet connection, such as to a website. Internet Network Application 34*b* detects a user request for connection, at a communication step 301. The request is first sent to TCP/IP stack 333 to resolve domain name or URL into an IP address. Resolving domain name may require accessing a DNS. However, the IP address from a DNS may be masked or otherwise misleading. TCP/IP stack 333 sends the request through to operating system 31*b* at a communication step 302, and the operating system makes a TCP connection through the internet to the Network Node 317, at a communication step 303.

Network Node 317 (e.g., a website's corresponding server) returns the request at a communication step 304. Also returned is the accurate IP address and port number of the Network Entity. Client operating system 31*b* receives the IP address and port number, and passes this information to TCP/IP stack 333 at a communication step 305. The TCP/IP stack passes control to the application 34*a* at a communication step 306. The application program may determine a category code of any file or other data received from Network Node 317. At a communication step 307, the application requests the IP address and port number from the TCP/IP stack. For example, the Network Application may invoke a GetIPAddressByName object or a GetHostByName object. The TCP/IP stack returns the IP address and port number to the application, at a communication step 308.

Network Application 34*b* then passes the IP address, port number, category code and other information to Authorization module 38*b*, at a communication step 309. The Authorization module uses this information to check database 350. The Authorization module may send a search request to database 350 with the IP address, port number, category code, and other information, at a communication step 310. Database 350 performs a search to determine whether the IP address and other information is included in the white list of trusted information. Database 350 may also determine an owner, country, security code, and/or other information associated with the IP address. Database 350 returns the requested information to Authorization module 38*b*, at a communication step 311. Authorization module 38*b* may pass the information directly to Network Application 34*b*. Based on whether the IP address and port number are in the white list, the Authorization module can send an instruction at step 312 to close the connection, reject information that was received, send out a warning message, waiting for a user decision, and/or other predefined action.

Example Scenario 2: Inbound Connection

Network Node 317 may request a connection to client 20*b*, at a communication step 304. Client operation system 31*b* receives this request, which includes the IP address and port number of Network Node 317. The request generally also includes the port number of Network Application 34*b*, to identify Network Application 34*b* as the resource that the Network Node desires to contact. The request may further include a file name or other information on the data that the Network Node desires. The operating system passes this information to TCP/IP stack 333 at a communication step 305. The TCP/IP stack passes this information to Internet Network Application 34*b* at a communication step 306.

Network Application 34*b* then passes the IP address, port number, and other information to Authorization module 38*b*, at a communication step 309. The Authorization module may determine a category code for any information that was requested by Network Node 317. The Authorization module uses this information to check database 350. The Authorization module may send a search request to database 350 with the IP address, port number, category code, and other information, at a communication step 310. Database 350 performs a search to determine whether the IP address and other information is included in the white list of trusted information. Database 350 may also determine an owner, country, security code, and/or other information associated with the IP address. Database 350 returns the requested information to Authorization module 38*b*, at a communication step 311. Authorization module 38*b* may pass the information directly to Network Application 34*b*. Based on whether the IP address and port number are in the white list, the Authorization module can send an instruction at step 312 to close the connection, reject information that was received, send out a warning message, waiting for a user decision, and/or other predefined action.

Example Scenario 3: Messaging

If the Network Application 34*b* is a messaging service, such as an email client like Microsoft Outlook™, it can check a received email header. In the header, there is a "Received From" field with the IP address and port number of the sending email device. The header may include other information such as IP addresses of devices associated with a courtesy copy (CC) recipient, an indication of any attachment to the received email, and/or other data. Network Application 34*b* may determine a category code of any attached file. The Network Application then passes the IP address, port number, and other information to Authorization module 38*b*, at a communication step 309. The Authorization module uses this information to determine whether the email sender is trusted. Specifically, the Authorization module sends the IP address and port number (and category code if available) in a search requests to database 350, at a communication step 310. The database checks for the IP address and port number in the white list. The database may also retrieve a domain name, email function code, security rating, and/or other data (if available). Database 350 returns the result of its search to Authorization 38a, at a communication step 311. Authorization module 38b may pass the information directly to Email Network Application 34b. Based on whether the IP address and port number are in the white list, the Authorization module can send an instruction at step 312 to delete the email, redirected the email (e.g., to a junk folder), send a warning, wait for a user instruction, and/or other action.

In more detail, an example embodiment of the present invention may comprise an Internet Email system using simple mail transport protocol (SMTP). For Internet Email, SMTP is used to deliver or retrieve mail. This is generally done through an intermediary mail server. When receiving email, the mail server will receive the IP address and TCP/UDP port number of a sending mail client. The mail server will add the sender's IP address to the "Received From" field of the email header. As described above, the IP address can be verified.

Another embodiment of such verification may also include a reverse DNS lookup by the mail server to authenticate a domain name of the email sender. It is noted that some mail servers use domain information to block spam email. Spam blocking may use domain information to check the mail server domain and/or the client sender's domain. However, as discussed above, domain information may be masked. With or without DNS lookup, embodiments of the current invention verify the email sender by checking the actual IP address of an email against a white list database. Nevertheless, additional information, such as the owner and country can be checked from domain information obtained from the IP address information in the email header. Additional confidence can be obtained by using a domain lookup to ensure that the received IP address is associated with the domain indicated in the received email address. For instance, the Authentication module may use the IP address from an email header to search a white list, or a domain assignment service, to determine a domain name associated with the IP address. The Authorization module can then compare the determined domain name against the domain name specified in the "Received From" field of the email message. If the domain names do not match, the message may be illegitimate. Even if the IP address and port number from the message match those in the white list, a differing domain name may indicate that a hacker accessed a trusted network node, and is using that trusted network node for spam messages or other undesired activities.

If the Email has been forwarded/relayed by another SMTP server, it's the receiver email client will also check if the forwarding/relaying mail server is trustworthy. If the email header is incomplete or the forwarding/relaying mail server cannot be used to identify the sender, the Authorization module can delete the email, or take other action discussed above.

Also, for SMTP email, the sender uses an email domain like xxxx@msn.com. With just the domain name, there is generally no easy way to identify whether this email is from a general MSN user or from a member of an important organization within MSN, such as an accounting or administration department. Being able to determine this level of detail is a function that a financial institution or other organization may want to have.

To solve this problem, the sending email service can establish multiple IP address for a certain department. Some IP addresses may be for general users. The other IP addresses can be used for special users and/or other special purpose. In this way, a financial institution or other organization can send a financial information email to their customers. In addition, or alternatively, the TCP/IP port can be used to support this function. This is useful if limited IP addresses are available for Internet mail services. In yet another embodiment, a sub-organization code can be included in communications and/or added to the white list database to identify sub-organizations or other categorization of emails. Similarly, a function code can be included in communications and/or added to the white list database to indicate a purpose for the communication. The customers' client devices can use an embodiment of the present invention to authenticate the sender, and check the codes for acceptable organizations and/or function codes, which may distinguish valid emails from phishing emails.

As with the warning displays for phishing websites, an email client can provide a display field. The email client may also provide a menu option to control the validation. When a user receives an email, the menu option and/or display field enable the user to identify the email sender, the sub-organization, and/or other functions/data. In one embodiment, the receiver email client will automatically compare the IP address, port number, and domain name of the sender and against a local white list database. If the sender's IP address (e.g., as determined based on the FROM or RECEIVED fields in the email), port number, and/or domain name are not in the database, or are different from those entries in the database, a display field is used to indicate that the email may not actually come from the sender shown in the email address. Alternatively, the user may activate a menu option to perform this check, to display information about the email or sender, and/or to perform other operations.

In some embodiments, white lists have one or more of the following features in addition to well-known organization IP addresses. A core advantage of the described white lists is that IP addresses used in a two-way communication (e.g., as part of a TCP/IP session) are difficult or impossible to forge. While it is possible for an attacker or other party to spoof a source LP address in a packet, such spoofing generally cannot be used in the TCP/IP context, where two-way communication is necessary to establish a session. Thus, by utilizing IP addresses obtained from the network stack, the described techniques can identify questionable network communications with a high degree of confidence.

In addition, white lists provide advantages over black lists in that once a questionable IP address is added to a black list, the unauthorized users of that IP address can just move their attack to a different computing system that operates with a different IP address. In a world where criminal organizations operate entire networks of compromised machines, it is trivial for those organizations to shift their unauthorized activities (e.g., sending spam) from one machine to another.

The described techniques may also function at multiple distinct levels within a given computing system. For example, the described techniques may utilize information received or obtained from the operating system kernel, the network stack, and the application. For example, the authorization module 38b (FIG. 5) may utilize information received from the application level (e.g., an email header field received from an email client), the network level (e.g., an IP address received from the TCP/IP stack), and the operating system (e.g., a permission setting received from the operating system kernel).

Also, the described techniques provide an infrastructure or framework for implementing security at different levels of the computing system. For example, a white list or similar structure may contain information or properties that are used to implement security or authorization facilities in the operating system kernel, the network stack, and one or more applications.

A white list may also allow communication with respect to specified geographic locations, possibly in conjunction with certain IP addresses. Geographic locations may be determined based on the regional Internet registry that has allocated a particular IP address. As discussed above, IP addresses are allocated by regional Internet registries, such as ARIN, APNIC, LACNIC, AfriNIC, RIPE NCC, and the like. Given an IP address, is possible to determine which regional Internet registry allocated the IP address, and thereby determine a region (e.g., a continent or country) associated with the IP address. The regional registry may further support queries that will provide the country or more detailed geographic information, such as a country, state, or city associated with an IP address. Other sources of geographic information include the whois database and commercial or public geo-location services that are configured to provide fine-grained geographic information, including country, state, city, latitude/longitude, postal code, area code, and the like.

Geographic information may be used to limit access to users in a specified region. For example, a government may limit access to IP addresses that are located in the country or jurisdiction of that government. As another example, IP addresses for specific regions may be flagged as dangerous, such as based on the high level of computer crime operating from those regions. As another example, an e-commerce computing system (e.g., a banking system, an online shopping system) may only allow customer accesses from IP addresses that are associated with the same geographic region (e.g., city, state, country) in which the customer resides. For example, if a particular customer resides in Seattle, a particular e-commerce system may only allow accesses to the customer's account from IP addresses that are allocated to Washington State or to the United States. Also, for high security organizations such as the government or military, the organization may only allow certain geographic locations to have access and block other locations (e.g., China).

White lists may take different forms in different embodiments. White lists may exist on the public Internet and/or on private internal networks. A white list can be created for a private internal network in a manner similar to that employed over the public Internet. For example, a bank may have a white list that associates a customer Internet IP address with a specific bank account. On the consumer side, the bank account holder may have a white list that includes the internal IP address of the bank's computing system. Also, multiple lists may exist on a single device. For example, one white list for inbound traffic and the one for outbound data. In addition, each Network Interface Card (NIC) may have its own white lists. In addition, white lists can be generated statically (e.g., predefined) or dynamically. For example, for websites, a dynamic list may be generated based on the incoming IP address information. Later accesses can then be compared based on the list, so that questionable communications can be indicated, such as when a Website URL resolves to an IP address that is different from one stored in the list.

Example white lists may contain one or more of the following fields or properties described below in Table 1. Each of the fields indicates one or more allowable communication properties, such as the allowed direction of communication (e.g., upload or download, send or receive), the allowed time period for communication (e.g., between 8 AM and 11 PM), the allowed program/process (e.g., Internet Explorer), and the like. In other embodiments, the table may also or instead include indications of disallowed communication properties, such as a time period during which communication is disallowed (e.g., between midnight and 4 AM), disallowed communication ports (e.g., port 80 commonly used for HTTP), or the like.

TABLE 1

| Field/Property | Description/Function |
|---|---|
| IP address and/or Mask | Identify allowable IP addresses or IP address ranges. For internal networks, the IP addresses may be internal (private) IP addresses. A mask may be used to specify a range of IP addresses. |
| Port numbers | Identify allowable port numbers or ranges, thereby implying alloable functions such as FTP, Telnet, HTTP, and the like. |
| Block state | Allow or disallow access from the corresponding address |
| Category code/ data type | Indicate the allowable type of data from the communication, such as executable code, scripts, macros, audio, video, image, text files, or the like. |
| Direction | Define allowable direction for communication, such as upload, download, incoming, outgoing. A highly secure device may, for example, disallow any inbound connections. |
| Security rating | Specify a security level associated with this IP address, such as highly secure, secure, general, not secure, high risk, or the like. |
| Sub-organization code | Specify a subset of IP address within an organization. For example, for an organization, it may divide their IP addresses into subgroup like one group for Web, the other group for Telnet. |
| URL/URI | Organization official URL associated with the IP addresses. Sometimes, HTTP redirect may redirect to very similar URL that, for example, hosts a phishing web site to fool people. As another example, an HTTP link in an email may look similar to a legitimate URL. URLs appearing in communications may be compared against the organizational URL to determine whether the communication is questionable. Furthermore, checking the URI may provide additional protection. |
| Domain name | Can be used to match the domain name. Email address has the domain name that can be checked. |

TABLE 1-continued

| Field/Property | Description/Function |
| --- | --- |
| Geographic location information | Country code, city, street address, zip code etc. This can be used to restrict access to certain geographic locations. Properties of this table can be associated with particular geographic locations, in addition to or instead of IP addresses or other identifiers (e.g., host names, domain names). |
| Network Interface | This is for multiple network interface (NIC) device. This field identifies a network interface (e.g., "eth0"). Properties of this table need not be associated with IP addresses or ranges, but can instead (or in addition) be associated with particular network interfaces. |
| Process name or signature | Specify which programs can access the network or communicate with a given IP address. This will prevent virus program to access network sending, receiving data, or spread itself to others. Programs may be identified by name, location, or signature/hash (e.g., MD5, SHA1, etc.). |
| Interactive/ Batch Mode | Many malicious programs will run in batch or non-interactive mode. This can prevent virus program accessing email account to send or receive data. The mode can be determined in various ways, such as checking whether there is an active console, UI window, interactive input device (e.g., mouse), or the like. |
| Access time | Specify a time or period during which network access is allowed. This will inhibit malicious code that runs during odd (e.g., late night) hours. |
| Number of connections | Limit how many inbound or outbound connections can be made to or from the network. This can be used to prevent denial-of-service attacks. |
| Access control | Specify what kinds of operations can be performed with respect to a corresponding IP address, including read, write, modify, execute, and the like. These access rights may be operating system specific or application specific. Certain applications may provide access rights that are distinct from those in the underlying system. For example, in a messaging application, sending an outgoing message may require an access right that is distinct from reading an incoming message. |
| User/group identifier | An identifier (e.g., user name, account number, user number) of a user or group of users that is allowed to use the corresponding IP address. For authentication purpose, it can verify user identification, password and IP address and/or port number. |
| Inbound/ outbound | Inbound traffic may have different security requirements than that of outbound traffic. Each may have separated white list. |
| Address validity | Require that the source address associated with any outbound network traffic is valid. |

The above fields may be combined in various ways. For example, with reference to FIG. 1, when a client 12, 13, or 14 initiates an outbound connection, it may check one or more of the process name, access time window, batch/interactive processing, destination IP address, URL/URI or domain name if appropriate, security rating, upload/download, category code, or payload type. In some embodiments, if any one of these items does not match the corresponding entries/fields in the white list the connection may be disallowed. In other embodiments, the user may be notified, such as by presenting a popup window/dialog, sending a message (e.g., an email) that describes the questionable communication, or the like.

As another example, when a client 12, 13, or 14 receives an inbound connection, it may check one or more of the IP address and port number of remote device, the program (process name) that is serving this connections (e.g., listening on the port), access time window, batch or Interactive process, URL/URI or domain name if appropriate, security rating, upload/download, category code, or payload type.

The white list may also include entries that identify generally secure systems or services, such as well-known corporations that have good security practices. For these systems (e.g., identified by IP address or domain name) it may be safe to allow access, download, or upload of any type of data.

If the device has already been infected by malicious code such as a virus, the described techniques can prevent the virus from accessing the network to upload important information by checking the program name (e.g., process name), the access time window, payload type, batch or interactive mode. This may prevent the virus from spreading to other device. If the virus is trying to open another program like web browser that is already on the allowable process list to access an online email account to send out data, the access time window and batch mode checking can still stop it by, for example, disallowing all batch mode web browser programs.

In some embodiments, the white list may be accessed by an IP address that is determined based on the payload of a network packet. The network communication may transported (e.g., transmitted, received) by way multiple network packets that each have a header and a payload section. The header section typically contains the control data necessary for the network to route or otherwise process the packet, such as source and destination address, error detection codes (e.g., checksums), sequence information (e.g., sequence number), and the like. The payload section includes user data. In a layered network protocol, the payload section may include control information for a higher layer of the network stack. For example, the payload of an IP datagram may encapsulate a TCP packet/segment, which itself may have a header section and payload section. Furthermore, the payload of the example TCP packet/segment may include control information and data from a higher-level (e.g., application level) protocol, such as HTTP.

The process may obtain contents from the payload section of a packet, and then determine the IP address based on those contents. In some cases, the contents may include an IP address of the sender that can be used directly. In other example, the contents may include a domain name of a sender that can be translated into an IP address, such as via a reverse DNS lookup.

One embodiment is configured to evaluate HTTP requests by determining an IP address based on the contents of one of the fields in the HTTP request header. The HTTP header may include fields such as X-Forwarded-For, which identifies the IP address of a client connecting to a Web server through an HTTP proxy or other intermediary translation system. The X-Forwarded-For IP address is an example of an IP address that is determined based on the payload of a network packet. Note that this IP address is typically different than the source IP address of the HTTP connection, since in a proxy scenario the source IP address of the HTTP connection is that of the proxy server.

As another example, some embodiments are configured to evaluate SIP ("Session Initiation Protocol") requests in the telephony and voice-over-IP context. For example, the SIP INVITE request includes FROM and CONTACT fields that include IP addresses or hostnames. When a hostname is included, that hostname can be translated to an IP address by way of a reverse DNS lookup.

As a further example, some embodiments are configured to evaluate virtual private networking ("VPN") communications by extracting an encapsulated IP address. VPN protocols typically encapsulate packets transmitted by an endpoint system or process via the virtual network interface. Such packets may be encapsulated according to various standards, such as PPTP, IPsec, L2TP, and the like. Some embodiments may access and possibly decrypt the encapsulated packet to obtain or otherwise determine the source IP address of the packet. That IP address may then be used to access the whitelist.

Some of the described techniques can be used to address the issue of denial of service ("DOS") attacks. For example, some embodiments are specified to limit the number of inbound or outbound connections that can be made. Such a maximum can be specified globally (e.g., overall total number of connections shall not exceed a specified maximum), per-address or per-address block (e.g., maximum number of connections to a specific IP address or address range), per-host or per-domain (e.g., maximum number of connections to a specific hostname or domain name), per-geographic location (e.g., maximum number of connections to a specific country), or the like. By limiting the maximum number of connections, embodiments are able to prevent, limit, or reduce the impact of denial of service attacks, many of which rely on networks of compromised computers to direct network traffic against a target host.

Some embodiments provide a "listening port lockdown" processes. In such a process, the use of listening ports is restricted in order to limit the impact of DOS attacks and/or to generally limit or malicious network communications. An example of a listening port lockdown process is presented with respect to FIG. 7, below.

To further address the issue of DOS attacks, some embodiments check the source address associated with any outbound network traffic. Because some DOS attacks forge the source address of outbound packets, some embodiments ensure that the source address of each packet is the same as the IP address assigned to a given computer, or is at least within a specified range (e.g., within a specified subnet).

In a related approach, a malicious or questionable email may be detected in the following manner in some embodiments. First, an authorization module associated with an email client may extract the source email address from the FROM field in the email header (e.g., source@hostname.net). In malicious emails, the source email address is frequently forged, to make it appear that it comes from a friend or other known party. Then, the authorization module determines a first IP address based on the source email address, such as by performing a domain name lookup with the hostname (e.g., hostname.net) extracted from the source email address. Next, the authorization module will extract a second IP address from the RECEIVED field in the email header. The RECEIVED field is typically inserted by the recipient's SMTP server and includes the actual source IP address of the sender's SMTP server. Then, the authorization module compares the first and second IP addresses for a match. If they do not match, it is possible that the email is not authentic and the sender has forged the source email address, and appropriate action may be taken, such as notifying the user, refusing to open the email, disabling the rendering of images, markup language, or code, or the like.

Figure 6:
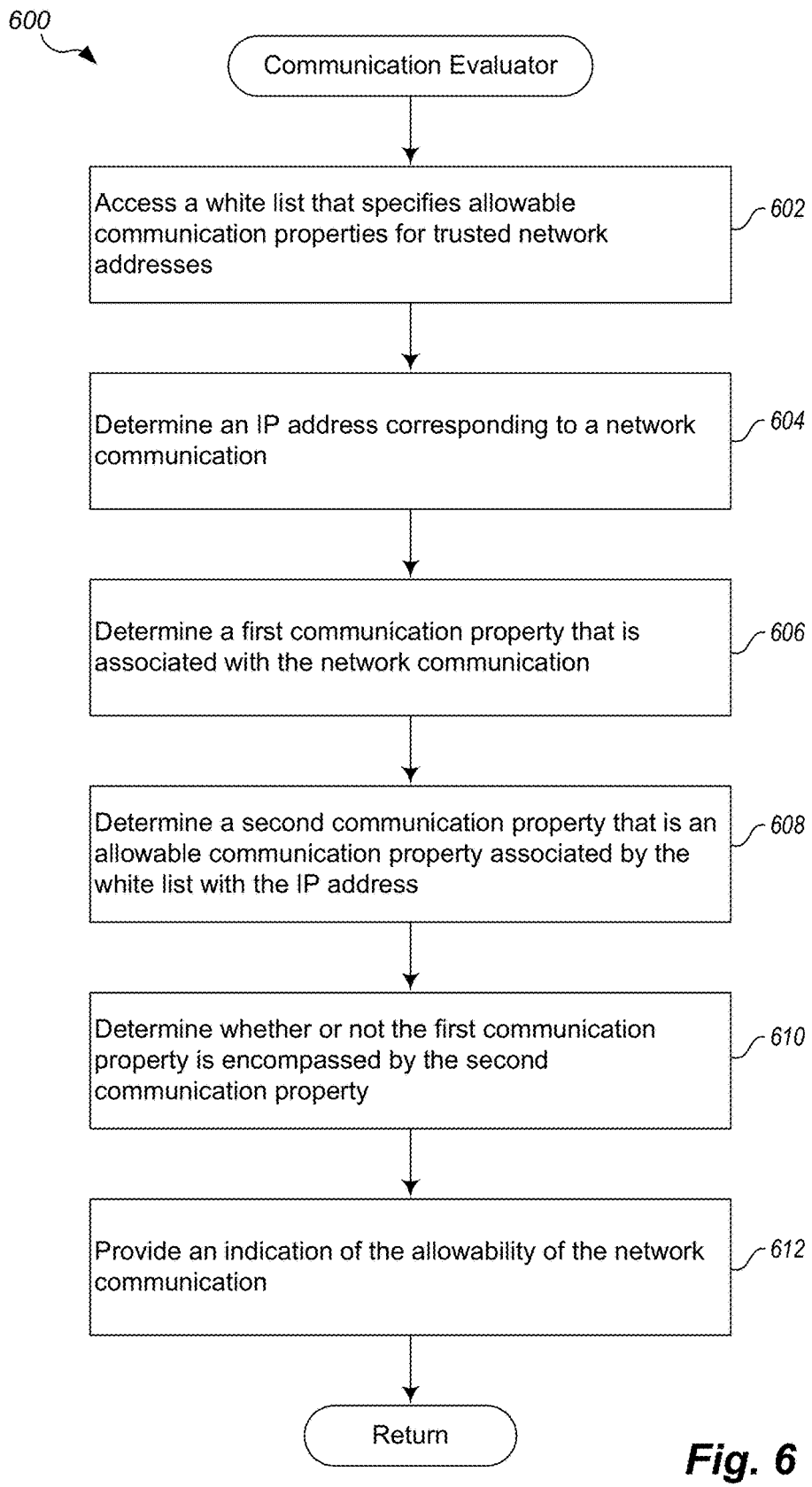
FIG. 6 is a flow diagram illustrating a network communication evaluator process.

FIG. 6 is a flow diagram illustrating a network communication evaluator process 600. The process 600 may be performed by a module such as the evaluation module 38 executed by the computing system 20 (FIG. 2).

The process begins at block 602, where it accesses a white list that specifies allowable communication properties for trusted network addresses. Accessing a white list may include receiving, querying, searching, or otherwise processing the white list. In some embodiments, the white list includes rows or entries that each include a trusted network address associated with indications of one or more allowable network communication properties, such as those described in Table 1, above.

At block 604, the process determines an IP address corresponding to a network communication. Determining the IP address may include requesting the IP address from the TCP/IP stack or other communication module in the computing system. The IP address may be the source or destination IP address. Typically, if the communication is an inbound connection, the source IP address will be checked, and if the communication is outbound, the destination IP address will be checked. In other scenarios, the IP address may be determined in other ways, such as by querying a DNS server with a domain name associated with the network communication. The domain name may be determined, for example, with reference to a URL, email message, email address, or the like.

As discussed above, the IP address may be determined based on the payload of a network packet. Determining the IP address may include reading the IP address from a specific field in the payload of the packet, such as by reading the X-Forwarded-For field in the context of an HTTP request. In other cases, determining the IP address may include obtaining a hostname from the payload of the network packet, and then translating the hostname into an IP address. In the case of VPN protocols, the IP address may be obtained from a source IP address field of an encapsulated (and typically encrypted) network packet stored in the payload.

At block 606, the process determines a first communication property that is associated with the network communication. Determining the first communication property includes, for example, determining one of the properties described in Table 1. For example, the process may determine properties such as the time of day, the directionality of the communication, the type of data payload, or the like. The process may determine a geographic location associated with the network communication by, for example, querying a geo-location information service with the IP address against, and receiving in response an indication of a location (e.g., city, state, country, postal code) associated with the IP address.

At block 608, the process determines a second communication property that is an allowable communication property associated by the white list with the IP address. Determining the second property may include looking up the IP address in the white list and retrieving the communication property that is associated with the IP address and that corresponds to the first communication property. For example, if the first communication property is the time of day, the process may look up the allowable communication time periods in the white list. If the first communication property is a geographic location, the process may look up the allowable geographic locations in the white list.

At block 610, the process determines whether or not the first communication property is encompassed by the second communication property. Determining whether the first property is encompassed by the second property may include determining whether the second property encloses or contains the first property. For example, if the second property is an allowable country (e.g., Washington state), the first property is encompassed by the country if the first property (e.g., Washington state, Seattle, a US postal code) is the same as or located within the allowable country. Similarly, if the second property is an allowable time period (e.g., between 6 AM and 11 PM), the first property is encompassed by the time period if the first property (e.g., 10 PM) is within the period.

In some embodiments, determining whether the first property is encompassed by the second property includes determining whether the two properties match. Matching properties may include performing an equivalence test, such as for equality between two strings, numbers, or other data types. In some cases, matching may be a strict equality test, whereas in other cases, an approximation may suffice, such as in case-insensitive string matching.

At block 612, the process provides an indication of the allowability of the network communication. Providing an indication of allowability may include notifying a user (e.g., via a dialog box or other popup window), sending a message (e.g., an email), recording an indication in a log, returning a value to another process or code block, or the like.

Some embodiments may provide additional or alternative functions. One embodiment performs user authentication, such as may occur in a Web context. Existing authentication schemes use a username/password combination. Some embodiments may also utilize one or more of the above-described techniques in conjunction with a username/password combination scheme. For example, some embodiments may check IP addresses in addition to usernames and passwords. As IP addresses are assigned and unique on the network, they cannot easily be faked by others. Thus, if a hacker has stolen a user's username and password, he will not be able to break into the account as she/he will not have the correct IP address. Port numbers and other properties (e.g., time of day, geographic region) may also be included in the authentication scheme. Note that many if not all of these properties may be determined without interaction, intervention, or participation of the user. For example, an IP address may be determined directly with reference to the TCP/IP stack.

Also, current Internet service providers may use either Network Address Translation (NAT) or proxy services, so that many user may share the same IP address. Some embodiments function in a NAT/proxy context by using NAT/proxy services (e.g., provided by routers or gateways) that allocate static TCP port numbers corresponding to the internal IP addresses managed by the NAT/proxy module, so that each internal IP will have same external IP address but have unique and identifiable port number.

Figure 7:
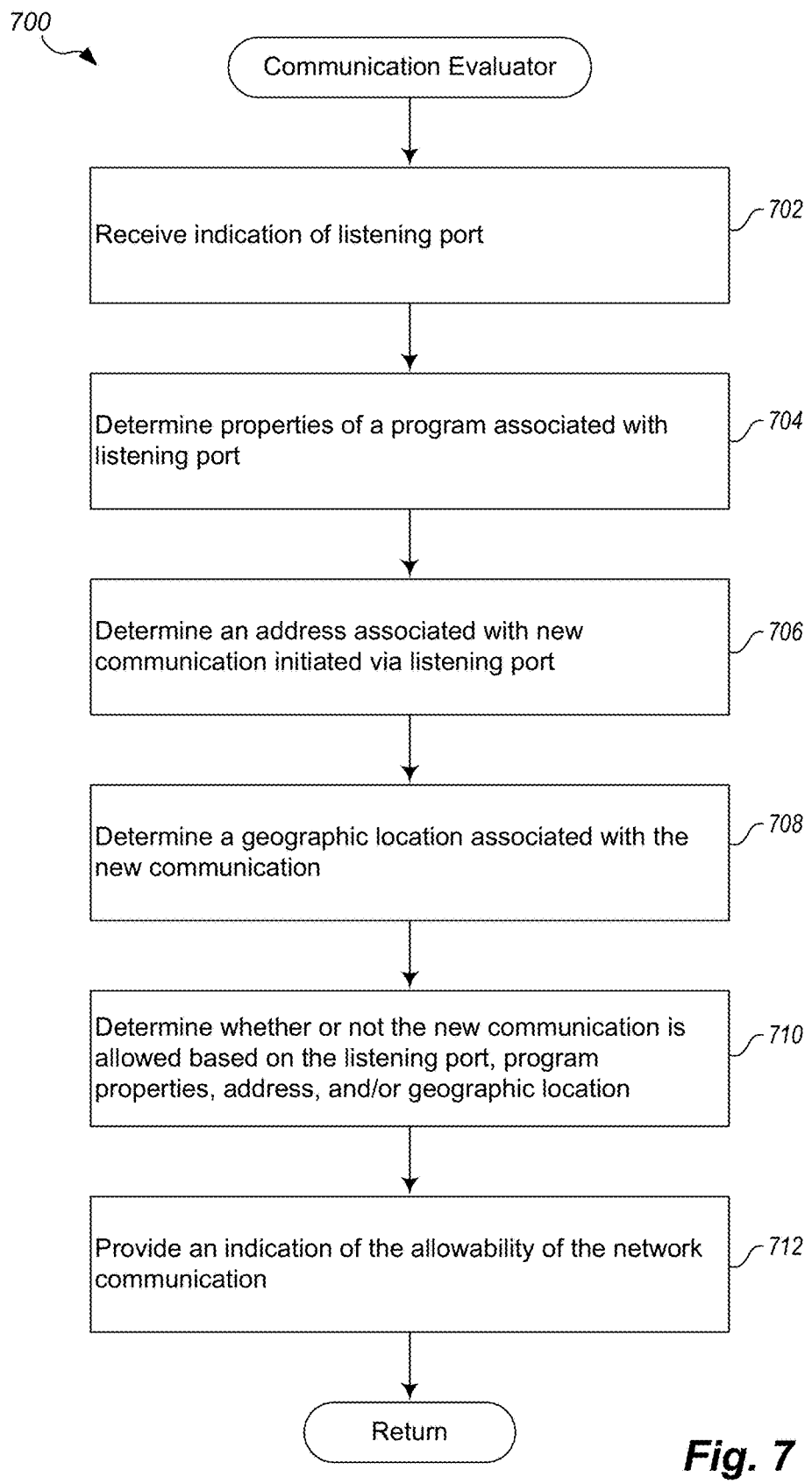
FIG. 7 is a flow diagram illustrating a network communication evaluator process.

FIG. 7 is a flow diagram illustrating a network communication evaluator process 700. The process 700 may be performed by a module such as the evaluation module 38 executed by the computing system 20 (FIG. 2).

The process begins at block 702, where it receives an indication of a listening port. A listening port is a port that is opened for purposes of receiving a new inbound communication. The listening port can be used to establish a new TCP/IP connection, to send/receive UDP messages/datagrams, or the like. The listening port may be opened based on the functioning of a legitimate server process (e.g., a Web server). Alternatively, the listening port may be opened up by a malicious program, such as Trojan or other malware that has infected a user's computer and opened a listening port for purposes of receiving instructions from a remote computer.

At block 704, the process determines properties of a program associated with the listening port. Determining properties of the program may include determining a program identifier, such as a program name, a process identifier, a hash of the program name, a hash of the program executable, or the like. Other properties may be determined instead or in addition, such as permissions, user/group information (e.g., owner of the program), program type, or the like. Program type may include whether the program is native (e.g., executable), a script, bytecode, or the like. Program type may also or instead include whether the program is interactive or non-interactive, as discussed above.

At block 706, the process, determines an address associated with new communication initiated via listening port. The address may be a network address and/or an associated port. The address may be the source or destination address. In some cases, the address may be provided by the networking module (e.g., TCP/IP stack) managed by the operating system of the local machine. In other cases, the address may be determined by inspecting the contents of a data packet or higher level networking protocol encapsulated within one or more layers of the communication. For example, the relevant address may be encapsulated within a VPN packet, contained within an HTTP header, or the like. As discussed above, the address may also be determined by translating domain names or other representations into a numeric network address.

At block 708, the process determines a geographic location associated with the new communication. The process may determine a geographic location associated with the new communication by, for example, querying a geo-location information service with the IP address against, and receiving in response an indication of a location (e.g., city, state, country, postal code) associated with the IP address.

At block 710, the process determines whether or not the new communication is allowed based on the listening port, program properties, address, and/or geographic location. Typically, the program determines allowable communication properties from a white list or similar data structure that specifies allowable communication properties, such as connection limits associated with a listening port, which program (or type of program) may communicate, which address (or range of addresses) is allowed to be used for communication, and which geographic locations are allowed. The process then determines whether the properties of the actual communication are allowed (encompassed by) with respect to the allowable communication properties.

In some embodiments, block 710 enforces a limit on the utilization of the listening port, such as by enforcing a maximum number of connections that can be opened via the listening port. The maximum number may represent a maximum number of current/active connections, a maximum number opened during some time window (e.g., 100 per hour), or the like. In other embodiments, the utilization may be limited based on how much bandwidth has been consumed via connections opened through the listening port, such as a maximum of 10 Mbits per second. Also, the utilization limit may be associated with a particular geographic region. For example, one embodiment may limit the number of active connections that may be open to IP addresses associated with a specified geographic region (e.g., city, country, continent).

In addition, limits may be established with respect to destination IP addresses, so as to limit the number of connections that can be made to a single IP address. The IP address can be fully or partially specified (e.g., via a range) or fully unspecified (e.g., "any" address). The above utilization limits can be employed to reduce the impact of denial of service attacks, by limiting inbound/outbound connections and/or bandwidth utilization.

At block 712, the process provides an indication of the allowability of the network communication. Providing an indication of allowability may include notifying a user (e.g., via a dialog box or other popup window), sending a message (e.g., an email), recording an indication in a log, returning a value to another process or code block, or the like.

In some embodiments, the process 700 evaluates whether the listening port is allowed to be opened, based on one or more properties of the opening program, time of day, port number, or the like. These properties can be specified in the white list or some other data structure. For example, the process 700 may determine whether the listening port can be used by one or more of: a particular program, a type of program (e.g., interactive, non-interactive), at a time of day (e.g., at night), a user identifier, or the like. If not, the process 700 may deny use of the listening port, transmit a warning or error message, log the unauthorized action, or the like. In some cases, the process 700 may allow the port to be opened, but only to accept connections according to particular properties (e.g., time of day).

In some embodiments, at least some of the above techniques can be applied to detect and limit denial of service attacks. In one embodiment, a process (e.g., process 700) monitors the communications (e.g., connections, messages, packets) being performed by the host system. The process 700 may then determine that a denial of service attack is progress based on one or more factors, including the total number of communications (e.g., connections opened), the total number of communications during a time interval (e.g., the last 5 minutes), the total number of communications to a same destination host, and the like. Note that this technique can be used to stop a host computing system from being employed (e.g., by a malicious party) to launch a denial of service attack against some other system. When a denial of service attack is detected, the process 700 may take various actions, such as refusing to allow additional communications (e.g., open additional connections, send additional packets) to the destination address.

The above specification, examples, and data provide a complete description of the manufacture and use of the composition of the invention. For example, digital certificates may be used for authentication, encryption may be used for communications, and other features may be included. However other embodiments will be clear to one skilled in the art. Since many embodiments of the invention can be made without departing from the spirit and scope of the invention, the invention resides in the claims hereinafter appended.

The invention claimed is:

1. A method in a computing system for controlling communication, comprising:
in a computing system, evaluating a network communication that is transported at least in part by network packets each having a header section and a payload section, by:
receiving one or more indications of allowable communication properties;
receiving an indication that a listening port has been opened on the computing system;
receiving an indication that the network communication has been established via the listening port; and
determining a first communication property that is associated with the network communication;
determining a second communication property that is one of the one or more allowable communication properties;
determining whether the network communication is allowable based on whether the first communication property is encompassed by the second communication property, including one or more of:
a property of a program that is using the listening port, including the identity of the program and/or whether the program is an interactive program, a batch program, or a system service;
a first IP address and/or port associated with the network communication;
a geographic location associated with the first IP address;
a connection limit based on the first IP address or the geographic location, the first IP address being a source or destination IP address;
a time of day; and
a network interface that is associated with the network communication; and
in response to determining that the network communication is not allowable, setting an indicator that the network communication is not allowed.

2. The method of claim 1, wherein the first communication property is a total number of current connections opened via the listening port, wherein the second communication property is a maximum allowed number of connections that can be opened via the listening port, and wherein determining whether the network communication is allowable includes:
determining whether the total number of current connections is less than the maximum allowed number of connections.

3. The method of claim 2, further comprising determining the maximum number of allowed connections based on the first IP address.

4. The method of claim 2, further comprising determining the maximum number of allowed connections based on a geographic location associated with the first IP address.

5. The method of claim 1, wherein the connection limit is expressed as one of: a maximum number of current connections established via the listening port, a maximum number of connections opened via the listening port during a time interval, a maximum bandwidth utilization by connections established via the listening port.

6. The method of claim 1, wherein the first communication property includes a name or type of program that is communicating via the network communication, wherein the second communication property includes a name or type of program that is allowed to communicate via the listening port, and wherein determining whether the network communication is allowable includes:

determining whether the name or type of the communicating program matches the name or type of program that is allowed to communicate via the listening port.

7. The method of claim 6, wherein the type of program that is allowed to communicate is one or more of an interactive program, a batch program, and a system service.

8. The method of claim 7, further comprising determining whether the communicating program is operating in interactive or non-interactive mode by checking whether the communicating program has is an active console, user interface window, or interactive input device.

9. The method of claim 1, further comprising:

determining that a denial of service attack is in progress, based on a number of connections opened during a time interval, wherein all of the connections are to a same destination address; and refusing to open additional connections to the destination address.

10. The method of claim 1, further comprising: determining the first IP address, wherein the first IP address is based on contents of the payload section of a network packet received via the network communication.

11. The method of claim 10, wherein the first IP address is an IP address stored in a source address field of an IP packet encapsulated in the payload section of the network packet.

12. The method of claim 10, wherein determining the first IP address includes:

translating a domain name into the first IP address, wherein the domain name is stored in the payload section of the first network packet.

13. The method of claim 10, wherein the network communication is an HTTP communication, wherein the first IP address is obtained based on an IP address value located in an X-Forwarded-For field located in the payload section of the first network packet.

14. The method of claim 1, wherein the network communication is an INVITE request of a SIP communication, wherein the first IP address is obtained based on a FROM or CONTACT field located in the payload section of the first network packet.

15. The method of claim 1, wherein the network packets are VPN packets, wherein the first IP address is an IP source address located in a header section of a packet encapsulated in the payload section of the first network packet, wherein the packet is encapsulated according to one of PPTP, IPsec, and L2TP.

16. The method of claim 15, wherein the packet encapsulated in the payload section of the first network packet is encrypted.

17. The method of claim 1, wherein the allowable communication properties in the white list include, for each of multiple network addresses in the white list, an indication of an allowable geographic location, and further comprising:

determining, by querying a geo-location information provider, a geographic location associated with the first IP address; and determining whether the geographic location associated with the first IP address matches or is encompassed by the geographic location indicated as allowable by the entry in the white list.

18. The method of claim 1, wherein the allowable communication properties in the white list include an indication of allowable access times, an allowable user, and allowable data type, the white list including indications of multiple allowable data types, including executable code, script, macro, audio, video, image, and text, and further comprising:

determining a time at which the network communication is occurring;

determining a user associated with the network communication;

determining a data type corresponding to data transferred via the network connection; and determining whether the determined time matches or is encompassed by the access times indicated as allowable by the entry in the white list;

determining whether the determined user matches or is encompassed by the user indicated as allowable by the entry in the white list; and determining whether the determined data type matches the data type indicated as allowable by the entry in the white list.

19. A non-transitory computer readable medium, comprising executable instructions for causing a computing device to perform the method of claim 1.

20. A system for controlling communication, comprising:

a communication interface for communication with a network resource, the communication interface including a TCP/IP stack;

a memory that stores instructions; and a processor in communication with the communication interface and with the memory, wherein the processor is configured to evaluate a network communication that is transported at least in part by network packets each having a header section and a payload section, by:

receiving one or more indications of allowable communication properties;

receiving an indication that a listening port has been opened on the computing system;

determining a first communication property that is associated with the network communication;

determining a second communication property that is one of the one or more allowable communication properties, the second communication property including:

a property of a program that is using the listening port, including the identity of the program and/or whether the program is an interactive program, a batch program, or a system service; and/or a connection limit based on a first IP address and a geographic location associated with the first IP address, the first IP address being a source or destination IP address determined based on the payload of a network packet;

determining whether the network communication is allowable based on whether the first communication property is encompassed by the second communication property; and in response to determining that the network communication is not allowable, setting an indicator to one of the following:

the communication operation is not allowed;

a warning is to be provided prior to allowing the communication operation; and an instruction is needed from a user to determine whether the communication operation is allowed.

* * * * *